(12) United States Patent
Hino

(10) Patent No.: US 10,615,503 B2
(45) Date of Patent: Apr. 7, 2020

(54) CIRCULARLY POLARIZED ANTENNA AND ATTITUDE CALCULATING DEVICE

(71) Applicant: Furuno Electric Co., Ltd., Nishinomiya (JP)

(72) Inventor: Akihiro Hino, Kakogawa (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 344 days.

(21) Appl. No.: 15/569,967

(22) PCT Filed: Mar. 9, 2016

(86) PCT No.: PCT/JP2016/057284
§ 371 (c)(1),
(2) Date: Oct. 27, 2017

(87) PCT Pub. No.: WO2016/174930
PCT Pub. Date: Nov. 3, 2016

(65) Prior Publication Data
US 2018/0159227 A1 Jun. 7, 2018

(30) Foreign Application Priority Data

Apr. 30, 2015 (JP) ................................. 2015-093155

(51) Int. Cl.
*H01Q 9/04* (2006.01)
*H01Q 13/18* (2006.01)
(Continued)

(52) U.S. Cl.
CPC ......... *H01Q 9/0428* (2013.01); *G01S 5/0221* (2013.01); *G01S 5/0247* (2013.01);
(Continued)

(58) Field of Classification Search
CPC .......... H01Q 9/0428; H01Q 1/24; H01Q 7/00; H01Q 13/18; G01S 5/0221; G01S 5/0247; G01S 5/14
(Continued)

(56) References Cited

U.S. PATENT DOCUMENTS

| 5,025,264 A | 6/1991 | Stafford |
| 8,421,693 B2 * | 4/2013 | Ohshima ............... H01Q 1/3275 343/713 |

(Continued)

FOREIGN PATENT DOCUMENTS

| EP | 1334536 A2 | 8/2003 |
| JP | 2008064555 A | 3/2008 |

(Continued)

OTHER PUBLICATIONS

Chen, "Compact circularly polarised microstrip antenna with slotted ground plane," Electronics Letters, vol. 38, No. 13, Jun. 20, 2002, 2 pages.

(Continued)

*Primary Examiner* — Harry K Liu
(74) *Attorney, Agent, or Firm* — Alleman Hall Creasman & Tuttle LLP

(57) ABSTRACT

The purpose is to provide a compact circularly polarized antenna while obtaining desired antenna characteristics. The circularly polarized antenna may include an antenna substrate formed with a flat film conductor configured to transmit and receive a circularly polarized wave, and a cavity formed in a surface of the antenna substrate opposite from a radiation surface. The cavity may at least partially overlap with the flat film conductor when seen in a depth direction of the cavity. The length of the cavity in at least one direction may be shorter than half of a wavelength of the circularly polarized wave.

19 Claims, 17 Drawing Sheets

(51) Int. Cl.
*G01S 5/14* (2006.01)
*H01Q 7/00* (2006.01)
*H01Q 1/24* (2006.01)
*G01S 5/02* (2010.01)

(52) U.S. Cl.
CPC ............... *G01S 5/14* (2013.01); *H01Q 1/24* (2013.01); *H01Q 7/00* (2013.01); *H01Q 13/18* (2013.01)

(58) Field of Classification Search
USPC .......................................... 342/363
See application file for complete search history.

(56) References Cited

U.S. PATENT DOCUMENTS

| | | | |
|---|---|---|---|
| 2009/0073074 A1* | 3/2009 | Chang | H01Q 9/0428 343/846 |
| 2010/0007555 A1 | 1/2010 | Ezal et al. | |
| 2011/0234466 A1* | 9/2011 | Yamada | H01Q 13/06 343/786 |
| 2012/0154235 A1* | 6/2012 | Nakamura | H01Q 9/0428 343/787 |
| 2014/0340263 A1* | 11/2014 | Zeng | H01Q 1/38 343/700 MS |

FOREIGN PATENT DOCUMENTS

| | | |
|---|---|---|
| JP | 2010109623 A | 5/2010 |
| JP | 2013141216 A | 7/2013 |
| WO | 0219468 A2 | 3/2002 |

OTHER PUBLICATIONS

European Patent Office, Extended European Search Report Issued in Application No. 16786207.7, dated Nov. 12, 2018, Germany, 10 pages.

ISA Japan Patent Office, International Search Report Issued in PCT Application No. PCT/JP2016/057284, dated May 31, 2016, WIPO, 4 pages. (Submitted with English Translation of International Search Report).

* cited by examiner

CIRCULARLY POLARIZED ANTENNA AND ATTITUDE CALCULATING DEVICE

TECHNICAL FIELD

The present disclosure relates to a circularly polarized antenna which transmits and receives a circularly polarized wave, and to an attitude calculating device which includes the circularly polarized antenna.

BACKGROUND ART

Conventionally, various circularly polarized antennas are put in practical use. For example, Patent Document 1 discloses a slot bow-tie antenna which transmits and receives a circularly polarized wave.

An antenna of Patent Document 1 includes a loop conductor and a conductive housing. The loop conductor has a substantially annular shape with a part of the circle lacking (C-shape). The housing is disposed to surround the loop conductor. A wall of the housing on a radiation surface side of the loop conductor is formed with bow-tie slots. The bow-tie slots overlap with the loop conductor in a perpendicular direction to the radiation surface of the loop conductor.

Further the antenna of Patent Document 1 includes a slot conductor formed with bow-tie slots, and a loop conductor. The slot conductor is formed on a first dielectric substrate, and the loop conductor is formed on a second dielectric substrate. The first and second dielectric substrates overlap with each other. Here, the loop conductor is disposed between the first and second dielectric substrates. The slot conductor faces the loop conductor via the first dielectric substrate.

REFERENCE DOCUMENT OF CONVENTIONAL ART

Patent Document

Patent Document 1 JP2010-109623A

DESCRIPTION OF THE DISCLOSURE

Problems to be Solved by the Disclosure

With the antenna of Patent Document 1, however, it is difficult to downsize while obtaining desired antenna characteristics (gain and directivity).

Therefore, the purpose of the present disclosure is to provide a compact circularly polarized antenna while obtaining desired antenna characteristics.

Summary of the Disclosure

According to one aspect of the present disclosure, a circularly polarized antenna may be provided, which includes an antenna substrate and a cavity. The antenna substrate may be formed with a flat film conductor configured to transmit and receive a circularly polarized wave. The cavity may be formed in a surface of the antenna substrate opposite from a radiation surface. The cavity may at least partially overlap with the flat film conductor when seen in a depth direction of the cavity. The length of the cavity in at least one direction may be shorter than half of a wavelength of the circularly polarized wave.

With this structure, since the length of the cavity in the depth direction is shorter than the wavelength of the circularly polarized wave, a wavelength shortening effect may be obtained, and the length of the part of the flat film conductor which contributes to the radiation may be shortened with respect to the wavelength of the circularly polarized wave to be transmitted and received.

Further, with the circularly polarized antenna of the present disclosure, the flat film conductor may include a loop conductor. The cavity may include a first cavity located to enclose the loop conductor therein.

With this structure, the length of the loop conductor may be shortened with respect to the circularly polarized wave to be transmitted and received and a formation area of the loop conductor may be reduced.

Further, with the circularly polarized antenna of the present disclosure, the flat film conductor may include a slot conductor formed with a slot. The cavity may include a second cavity at least partially overlapping with the slot conductor when seen in the depth direction of the cavity.

With this structure, the length of the slot may be shortened with respect to the circularly polarized wave to be transmitted and received and a formation area of the slot conductor may be reduced.

Effect of the Disclosure

According to the present disclosure, a circularly polarized antenna may be downsized while achieving desired antenna characteristics.

MODES FOR CARRYING OUT THE DISCLOSURE

Figure 1:
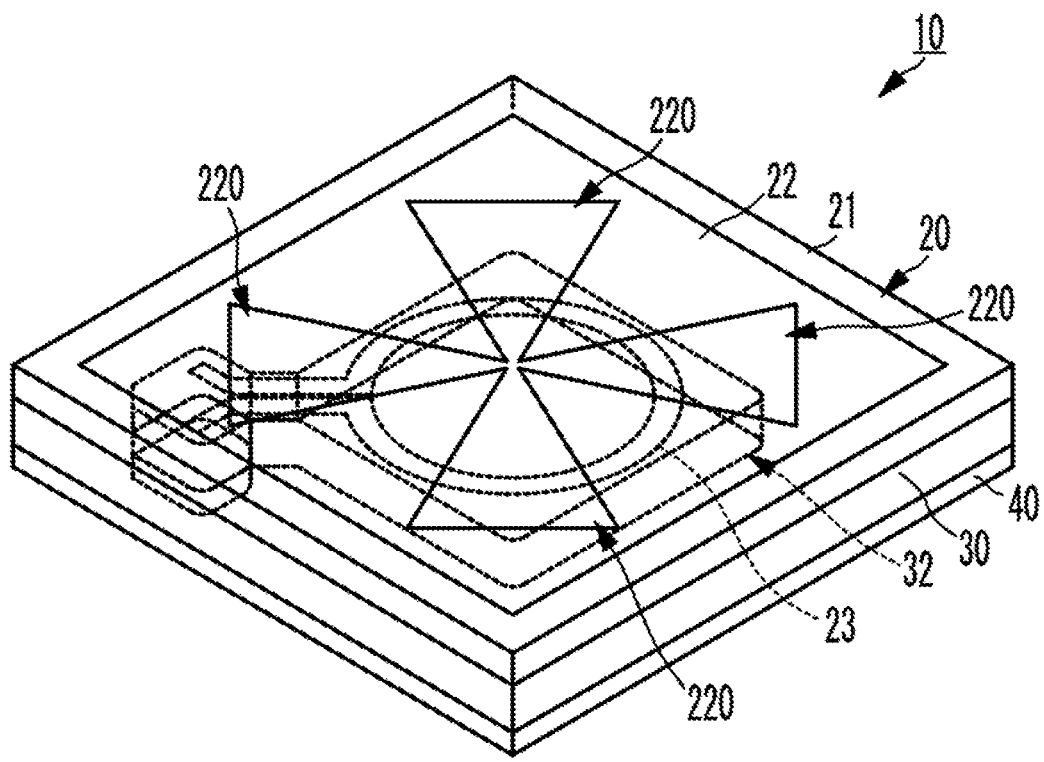
FIG. 1 is an external perspective view of a circularly polarized antenna according to a first embodiment of the present disclosure.
Figure 2:
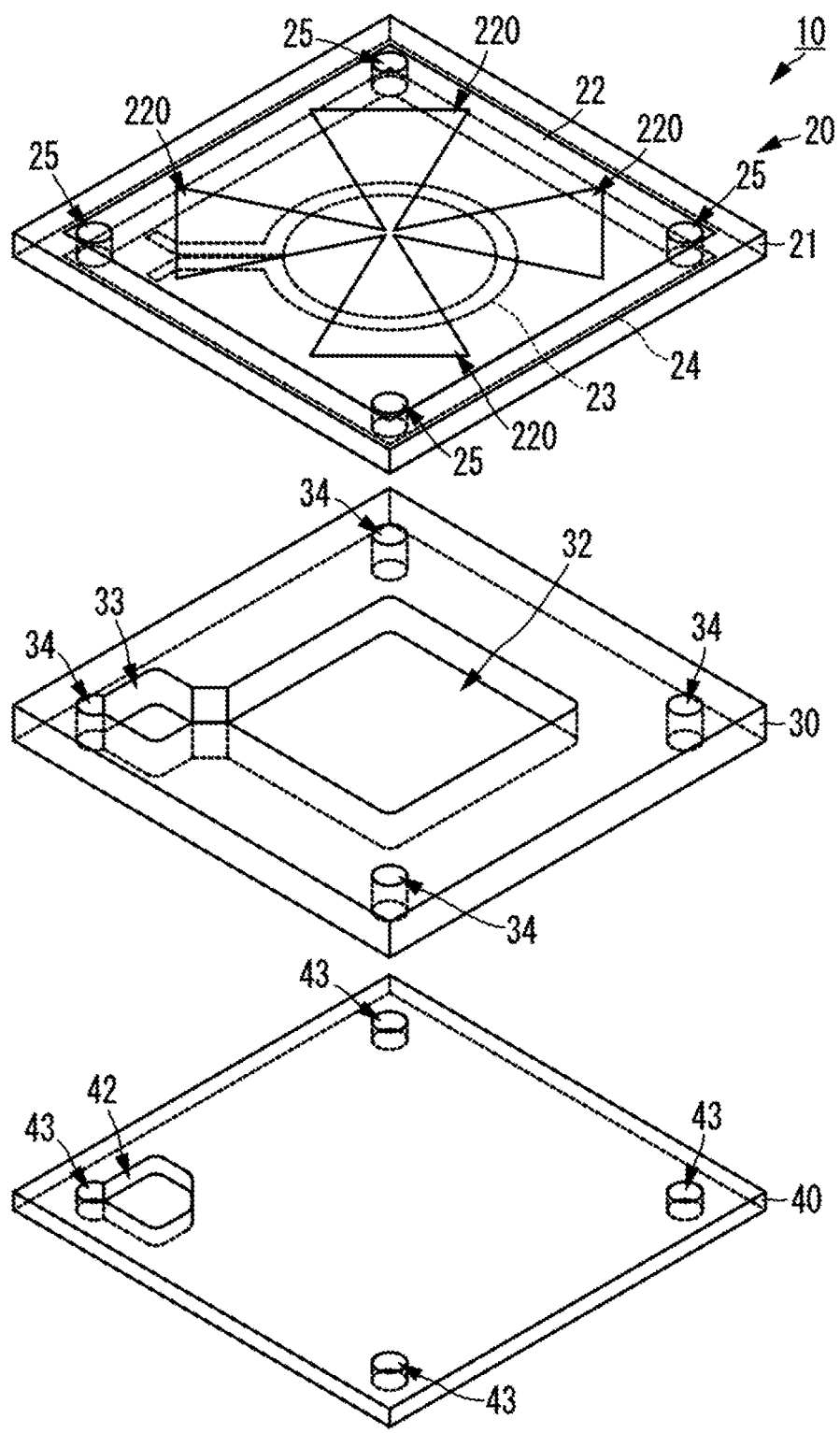
FIG. 2 is an exploded perspective view of the circularly polarized antenna according to the first embodiment of the present disclosure.
Figure 3A:
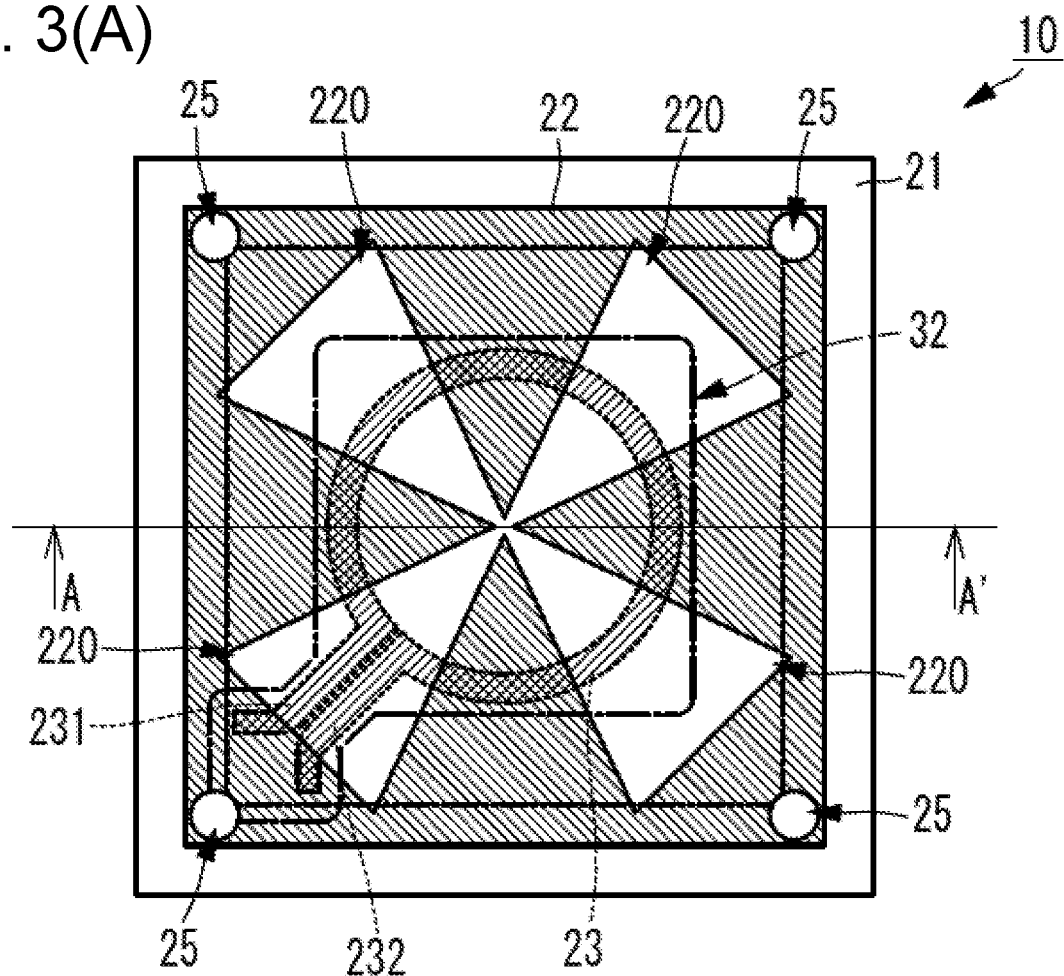
FIG. 3(A) is a plan view of the circularly polarized antenna according to the first embodiment of the present disclosure.
Figure 3B:
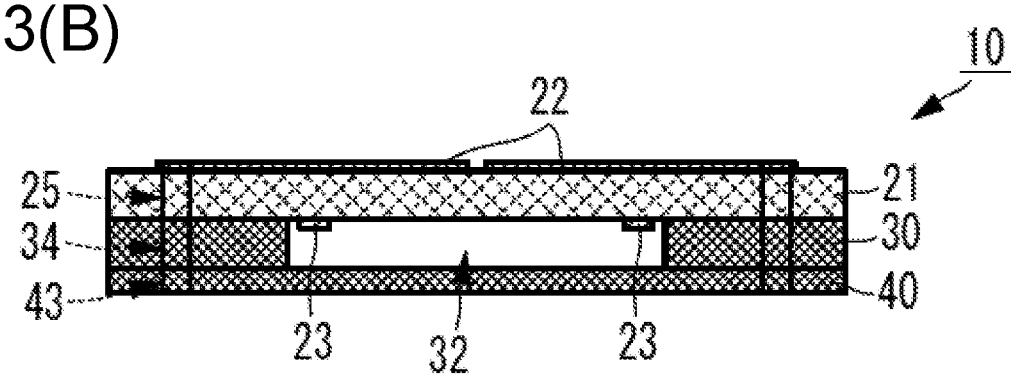
FIG. 3(B) is a cross-sectional side view of the circularly polarized antenna.

A circularly polarized antenna according to a first embodiment of the present disclosure is described with reference to the accompanying drawings. FIG. 1 is an external perspective view of the circularly polarized antenna according to the first embodiment of the present disclosure. FIG. 2 is an exploded perspective view of the circularly polarized antenna according to the first embodiment of the present disclosure. FIG. 3(A) is a plan view of the circularly polarized antenna according to the first embodiment of the present disclosure. In FIG. 3(A), some of conductors are hatched in order for easier understanding of the positional relationship of the conductors. FIG. 3(B) is a cross-sectional side view of the circularly polarized antenna according to the first embodiment of the present disclosure. FIG. 3(B) is the cross-sectional view taken along a line A-A' in FIG. 3(A).

The circularly polarized antenna 10 may include an antenna substrate 20 and conductive plates 30 and 40. A rear surface of the antenna substrate 20 may be in contact with a front surface of the conductive plate 30, and a rear surface of the conductive plate 30 may be in contact with a front surface of the conductive plate 40. That is, the antenna substrate 20, the conductive plate 30, and the conductive plate 40 may be stacked in this order. The antenna substrate 20 may be formed with through-holes 25. An inner wall of each through-hole 25 may be formed with a conductor so as to electrically connect a slot conductor 22 and a relay conductor 24 which are described later. Note that, the conductor of the inner wall of the through-hole 25 may be omitted. The conductive plate 30 may be formed with through-holes 34. The conductive plate 40 may be formed with through-holes 43. The through-holes 25, the through-holes 34, and the through-holes 43 may communicate with each other in a state where the antenna substrate 20, the conductive plate 30, and the conductive plate 40 are stacked on each other. By fixing the antenna substrate 20, the conductive plate 30, and the conductive plate 40 to each other using conductive screws (not illustrated) etc. inserted through the through-holes 25, 34 and 43, the shape of the circularly polarized antenna 10 may be maintained. Note that, these conductive screws etc. may be connected to ground (not illustrated).

Figure 4A:
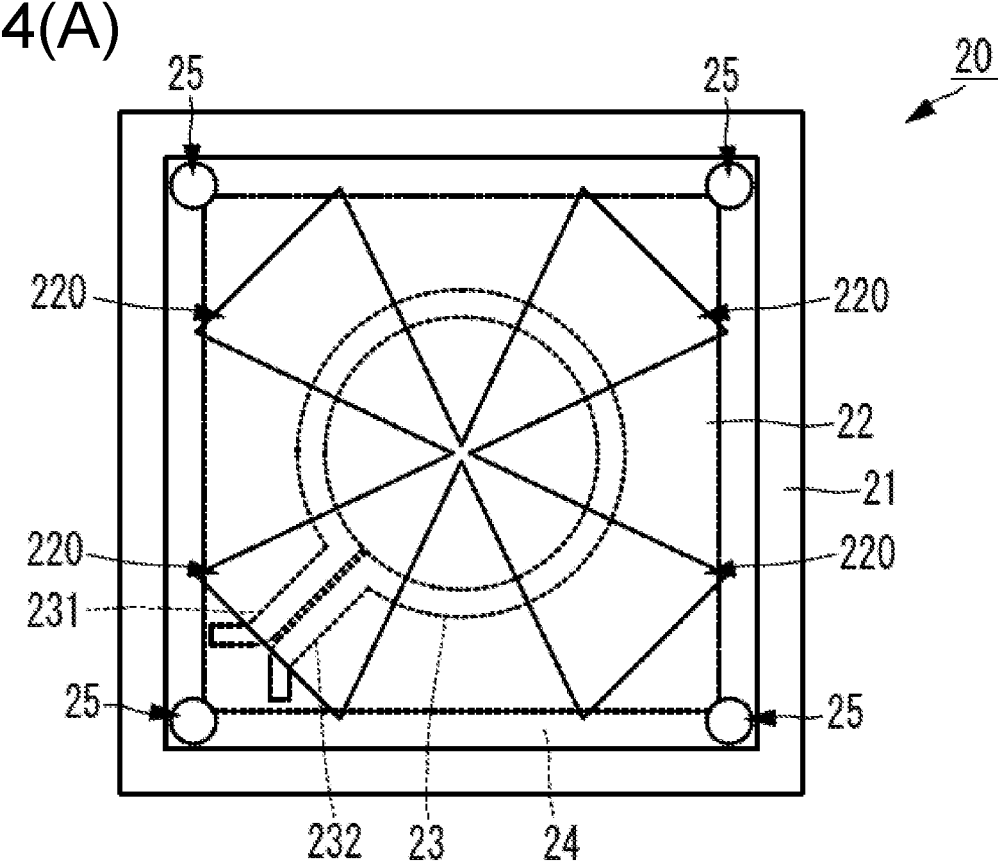
FIG. 4(A) is a plan view of an antenna substrate seen from a front surface thereof according to the first embodiment of the present disclosure.
Figure 4B:
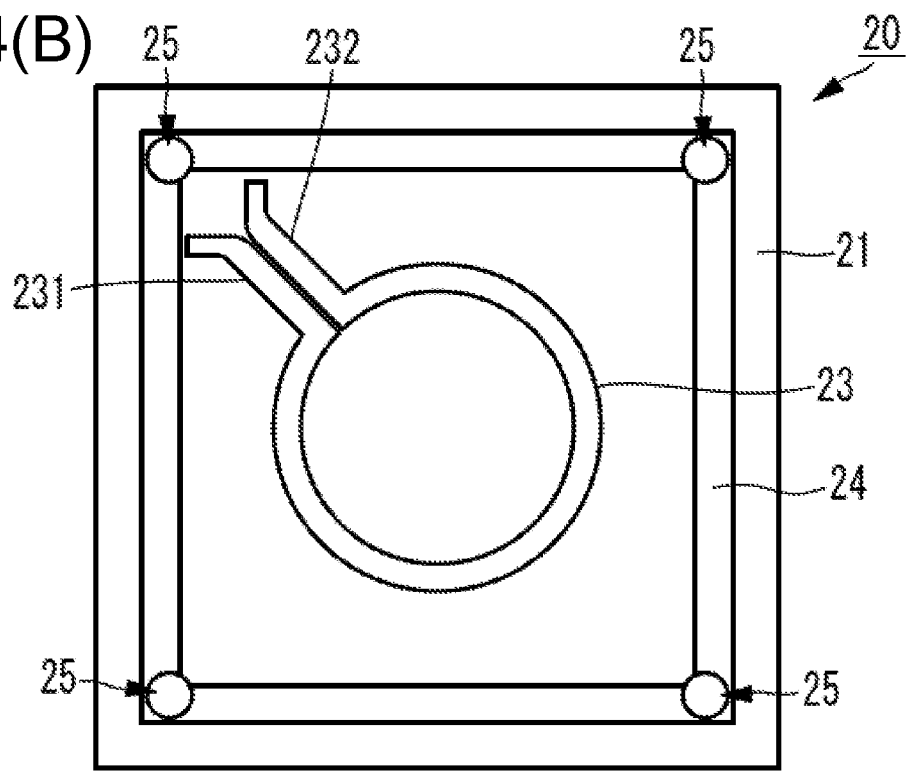
FIG. 4(B) is a plan view of the antenna substrate seen from a rear surface thereof.

FIG. 4(A) is a plan view of the antenna substrate seen from the front surface according to the first embodiment of the present disclosure. FIG. 4(B) is a plan view of the antenna substrate seen from the rear surface according to the first embodiment of the present disclosure.

The antenna substrate 20 may include a dielectric substrate 21, the slot conductor 22, a loop conductor 23, and the relay conductor 24. The dielectric substrate 21 may have a rectangular shape in a plan view. For example, in the case of this embodiment, the dielectric substrate 21 may have a square shape in a plan view. The slot conductor 22 and the loop conductor 23 may correspond to the "flat film conductor" of the present disclosure.

The slot conductor 22 may be formed on a front surface of the dielectric substrate 21. The slot conductor 22 may be formed to extend over substantially the entire front surface. The slot conductor 22 may be made of, for example, copper (Cu). The slot conductor 22 may be formed with bow-tie slots 220. The bow-tie slots 220 may be achieved by providing a no-conductor-formation portion in the slot conductor 22.

The bow-tie slots 220 may be formed in two pairs. Each bow-tie slot 220 may be formed to extend along a diagonal line of the dielectric substrate 21 from a center position of the slot conductor 22 in a plan view of the dielectric substrate 21. The bow-tie slot 220 may become wider as it approaches the corner from the center position side. End sections of the respective bow-tie slots 220 on the center position side may be connected to each other. The length of the bow-tie slot 220 may be set based on a wavelength λ of a radio wave transmitted and received by the circularly polarized antenna 10 (transmission-reception signal) to be about half of the wavelength (λ/2) but shorter than the half wavelength λ/2.

The loop conductor 23 may be formed on a rear surface of the dielectric substrate 21. The loop conductor 23 may have a shape formed by cutting an annular-shaped thin conductor at one position in a circumferential direction (C-shape). The loop conductor 23 may be made of, for example, copper (Cu). The center (the center of the annular shape) of the loop conductor 23 may substantially be in agreement with the center of the dielectric substrate 21 in a plan view (seen in a direction orthogonal to a radiation surface). The loop conductor 23 may overlap with each of the two pairs of bow-tie slots 220 by substantially the same area. The cut-out position of the loop conductor 23 may be located substantially on the diagonal line of the dielectric substrate 21.

One end of the cut-out portion of the loop conductor 23 may be extended to reach near one corner portion by a feeding conductor 231. The other end of the cut-out portion of the loop conductor 23 may be extended to reach near the one corner portion by a feeding conductor 232 and connected to the relay conductor 24 via a terminal resistor (not illustrated).

The length of the loop conductor 23 in the circumferential direction may be set based on the wavelength λ of the transmission-reception signal of the circularly polarized antenna 10, so as to be about the wavelength λ but shorter than the wavelength λ.

The relay conductor 24 may be formed on the rear surface of the dielectric substrate 21. The relay conductor 24 may be a linear conductor. The relay conductor 24 may be formed in the vicinity of the outer circumference of the rear surface of the dielectric substrate 21 so as to extend along the outer circumference. The slot conductor 22 and the relay conductor 24 may be electrically connected to each other by screws (described later) etc. The relay conductor 24 may be made of, for example, copper (Cu), similarly to the loop conductor 23.

Figure 5A:
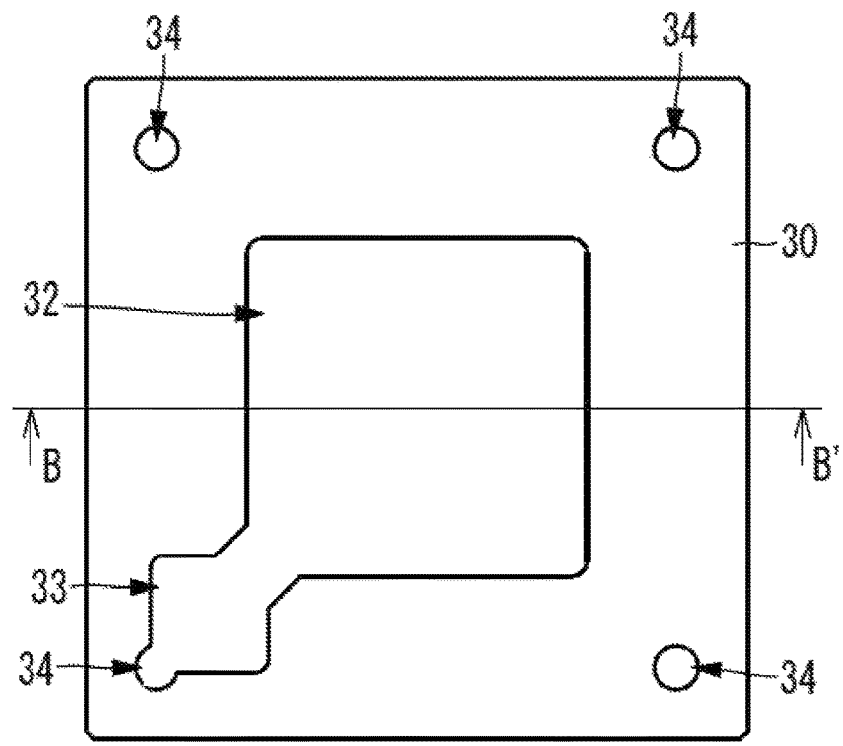
FIG. 5(A) is a plan view of a first conductive plate according to the first embodiment of the present disclosure.
Figure 5B:
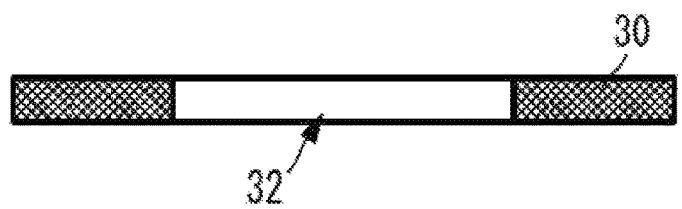
FIG. 5(B) is a cross-sectional side view of the first conductive plate.

FIG. 5(A) is a plan view of the first conductive plate (conductive plate 30) according to the first embodiment of the present disclosure. FIG. 5(B) is a cross-sectional side view of the first conductive plate (conductive plate 30) according to the first embodiment of the present disclosure. FIG. 5(B) is the cross-sectional view taken along a line B-B' in FIG. 5(A).

The conductive plate 30 may be made of a highly conductive material. For example, the material of the conductive plate 30 may be SUS, aluminum (Al) etc. It may be more preferable that the conductive plate 30 is made of a material having good workability.

The conductive plate 30 may be formed with a first cavity 32 and a wiring hole 33. The first cavity 32 and the wiring hole 33 may penetrate the conductive plate 30 from the front surface to the rear surface. The shapes of the opening surfaces of the first cavity 32 and the wiring hole 33 may be substantially rectangle.

The center of the first cavity 32 in a plan view may substantially be in agreement with the center of the conductive plate 30 in a plan view. As illustrated in FIG. 3(A), the first cavity 32 may have such a shape that the loop conductor 23 fits into the first cavity 32 in a plan view in the state where the antenna substrate 20 and the conductive plate 30 are stacked on each other.

The wiring hole 33 may be formed between the first cavity 32 and one corner portion of the conductive plate 30. The wiring hole 33 may communicate with the first cavity 32. The wiring hole 33 may have such a shape that the end portion of the feeding conductor 231 fits into the wiring hole 33 in a plan view in the state where the antenna substrate 20 and the conductive plate 30 are stacked on each other.

Similar to the conductive plate 30, the conductive plate 40 may be made of a highly conductive material. For example, the material of the conductive plate 40 is SUS, aluminum (Al) etc. It may be more preferable that the conductive plate 40 is made of a material having good workability.

As illustrated in FIGS. 2, 5(A) and 5(B), the conductive plate 40 may be formed with a wiring hole 42. The wiring hole 42 may penetrate the conductive plate 40 from the front surface to the rear surface. The shape of the opening surface of the wiring hole 42 may be substantially rectangle. Note that, corners of the inner wall of the wiring hole 42 may be chamfered. As illustrated in FIGS. 3(A) and 3(B), the wiring hole 42 may be formed at such a position and has such a shape that the wiring hole 33 and the wiring hole 42 overlap with each other in a plan view in the state where the conductive plate 30 and the conductive plate 40 are stacked on each other.

The antenna substrate 20 and the conductive plates 30 and 40, which are components of the circularly polarized antenna 10, have the above structures, and by stacking them as illustrated in FIGS. 1, 3(A) and 3(B), the following structural characteristics may be provided.

Since the conductive plate 30 is sandwiched between the antenna substrate 20 and the conductive plate 40, an end surface of the first cavity 32 opposite from the antenna substrate 20 may be sealed with the conductive plate 40. Note that, the end surface of the first cavity 32 opposite from the antenna substrate 20 may not be sealed by the conductive plate 40, as long as the end surface is a discontinuous surface with respect to the transmission-reception signal. The first cavity 32 may be formed so as to enclose the loop conductor 23 therein in a plan view of the circularly polarized antenna 10 (when seen in the depth direction of the first cavity 32). Further, the first cavity 32 may partially overlap with each bow-tie slot 220 in a plan view of the circularly polarized antenna 10. Here, the area of the first cavity 32 overlapping with each bow-tie slot 220 may be substantially the same.

Here, the size of the first cavity 32 may be determined as follows. The size of the first cavity 32 may be determined based on the electrical length, and defined by the length in the depth direction, the length in a longitudinal direction, and the length in a lateral direction. The longitudinal direction and the lateral direction of the first cavity 32 may be orthogonal to each other. The longitudinal direction and the lateral direction may be orthogonal to the depth direction. The length in the longitudinal direction and the length in the lateral direction may be set such that the loop conductor 23 fits into the first cavity 32. Further, the lengths of the first cavity 32 in the longitudinal, lateral and depth directions may be shorter than the wavelength λ of the transmission-reception signal, more preferably be shorter than the half wavelength λ/2.

By determining the size of the first cavity 32 in this manner, a wavelength shortening effect of the loop conductor 23 and the bow-tie slots 220 on the transmission-reception signal may be produced by the first cavity 32. Therefore, the length (the length in the circumferential direction) of the loop conductor 23 and the length of the bow-tie slot 220 may be shortened, which allows the planar area of the circularly polarized antenna 10 to be reduced.

Further, since the respective lengths constituting the size of the first cavity 32 are shorter than the wavelength λ of the transmission-reception signal, the impedance on the first cavity 32 side may seem to be infinite (open end) for the antenna substrate 20, and it may be hard for radio waves to enter the first cavity 32. As a result, the radio waves may easily be radiated to the front surface side of the antenna substrate 20, which is the radiation surface, and radiation characteristics may be improved.

Further, in the above structure, the slot conductor 22 may electrically be connected to the relay conductor 24 and the conductive plate 30 by the conductive screws etc. inserted through the through-holes 25. Thus, unnecessary radio wave radiation in the end portion of the slot conductor 22 may be reduced, which may improve the radiation characteristics even more.

Figure 6:
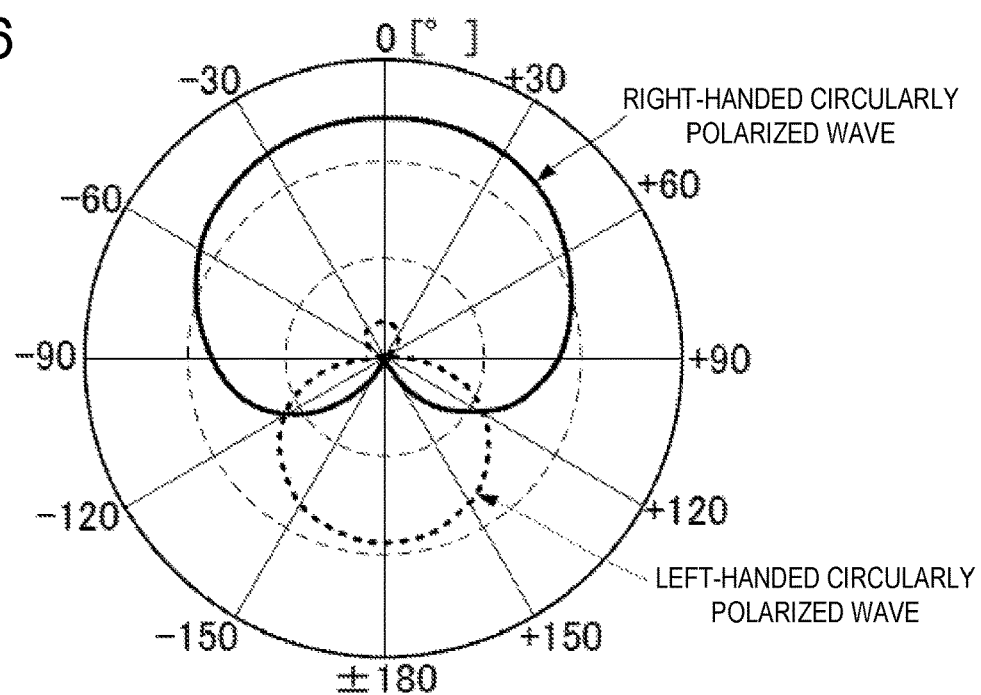
FIG. 6 is a chart illustrating characteristics of radiation directivity of the circularly polarized antenna according to the first embodiment of the present disclosure.

FIG. 6 is a chart illustrating characteristics of radiation directivity of the circularly polarized antenna according to the first embodiment of the present disclosure. As illustrated in FIG. 6, by using the circularly polarized antenna 10 of this embodiment, a high radiation gain may be obtained for a right-handed circularly polarized wave, which is a desired wave, in a wide angular range with respect to the zenith direction. As for a left-handed circularly polarized wave, which is an unnecessary wave, radiation gain with respect to the zenith direction may significantly be reduced.

Thus, it may be understood that the circularly polarized antenna 10 of this embodiment may obtain excellent radiation characteristics. Therefore, by using the configuration of the circularly polarized antenna 10 of this embodiment, excellent radiation characteristics and downsizing of the circularly polarized antenna 10 may be achieved.

Figure 7:
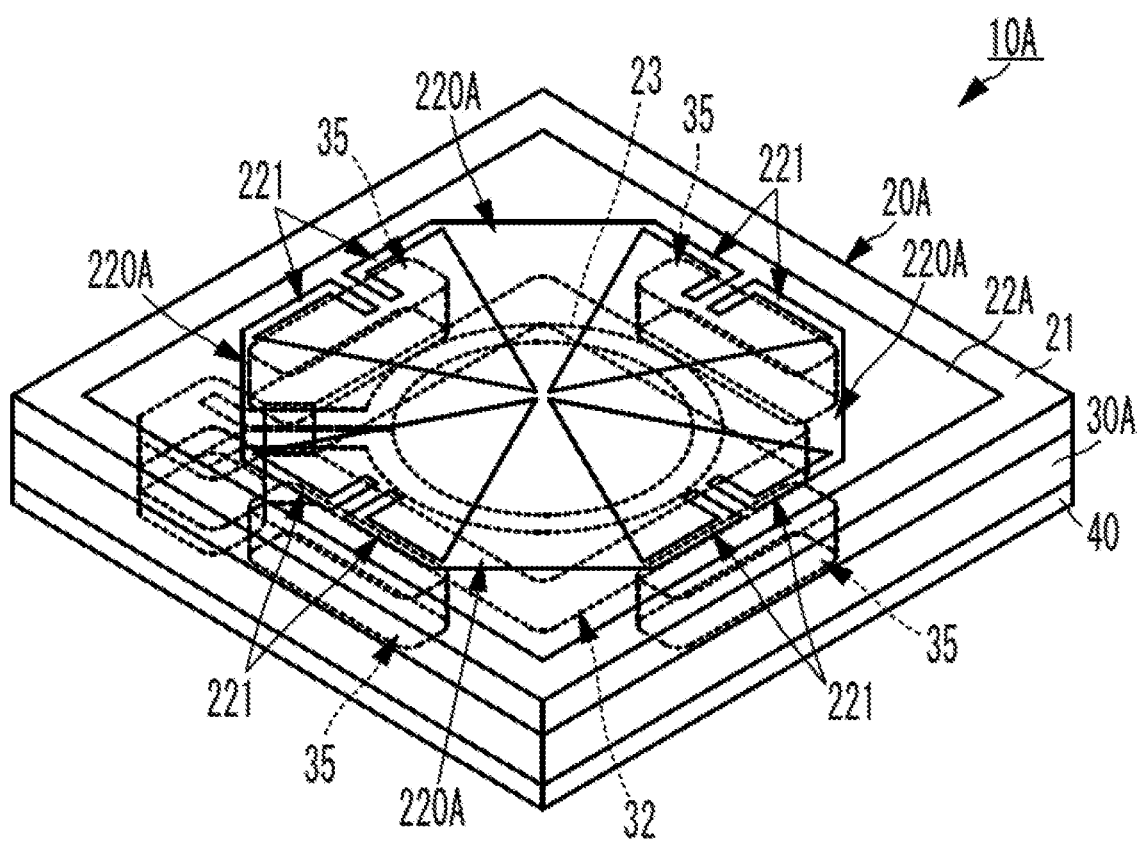
FIG. 7 is an external perspective view of a circularly polarized antenna according to a second embodiment of the present disclosure.
Figure 8:
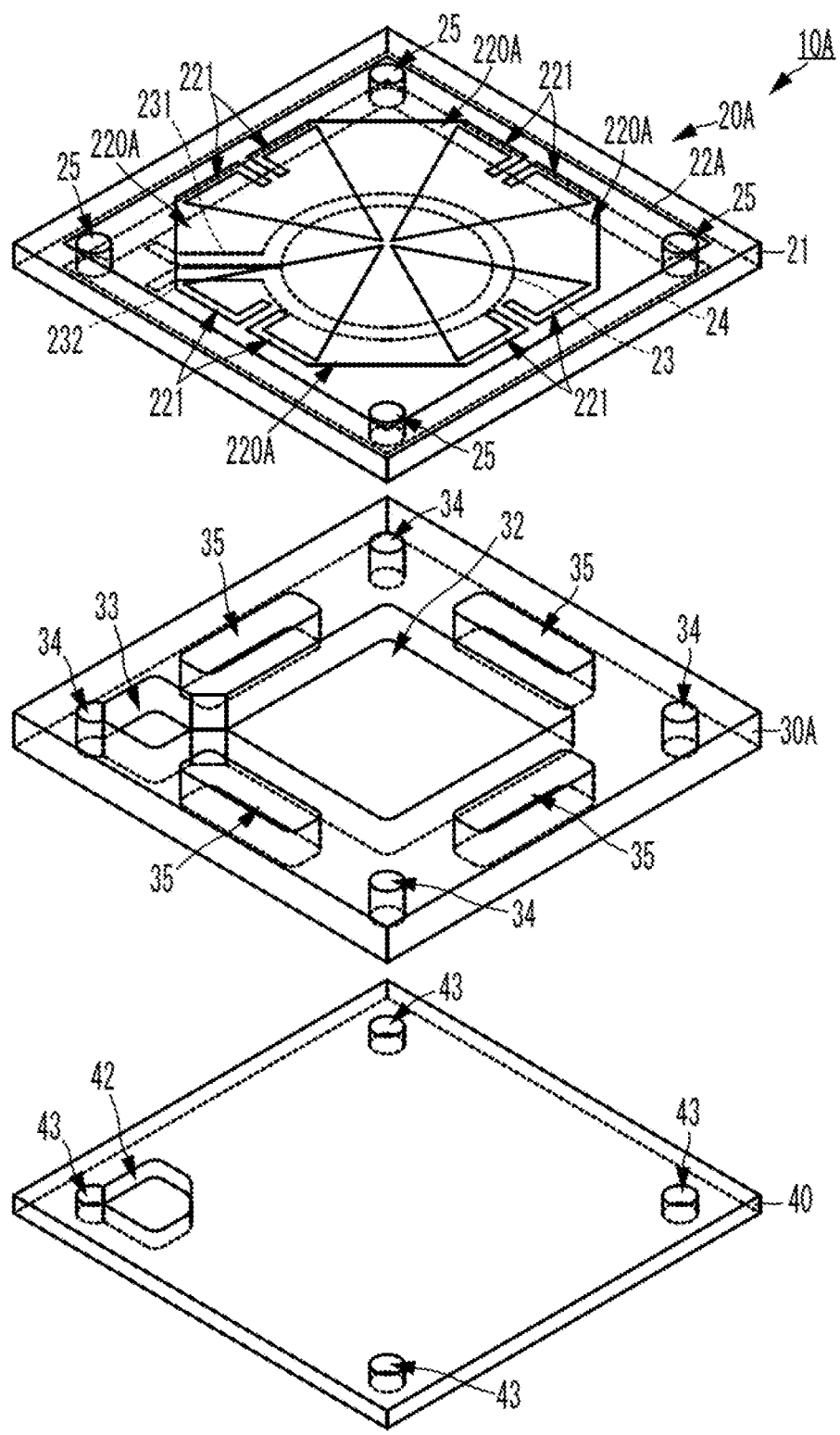
FIG. 8 is an exploded perspective view of the circularly polarized antenna according to the second embodiment of the present disclosure.
Figure 9A:
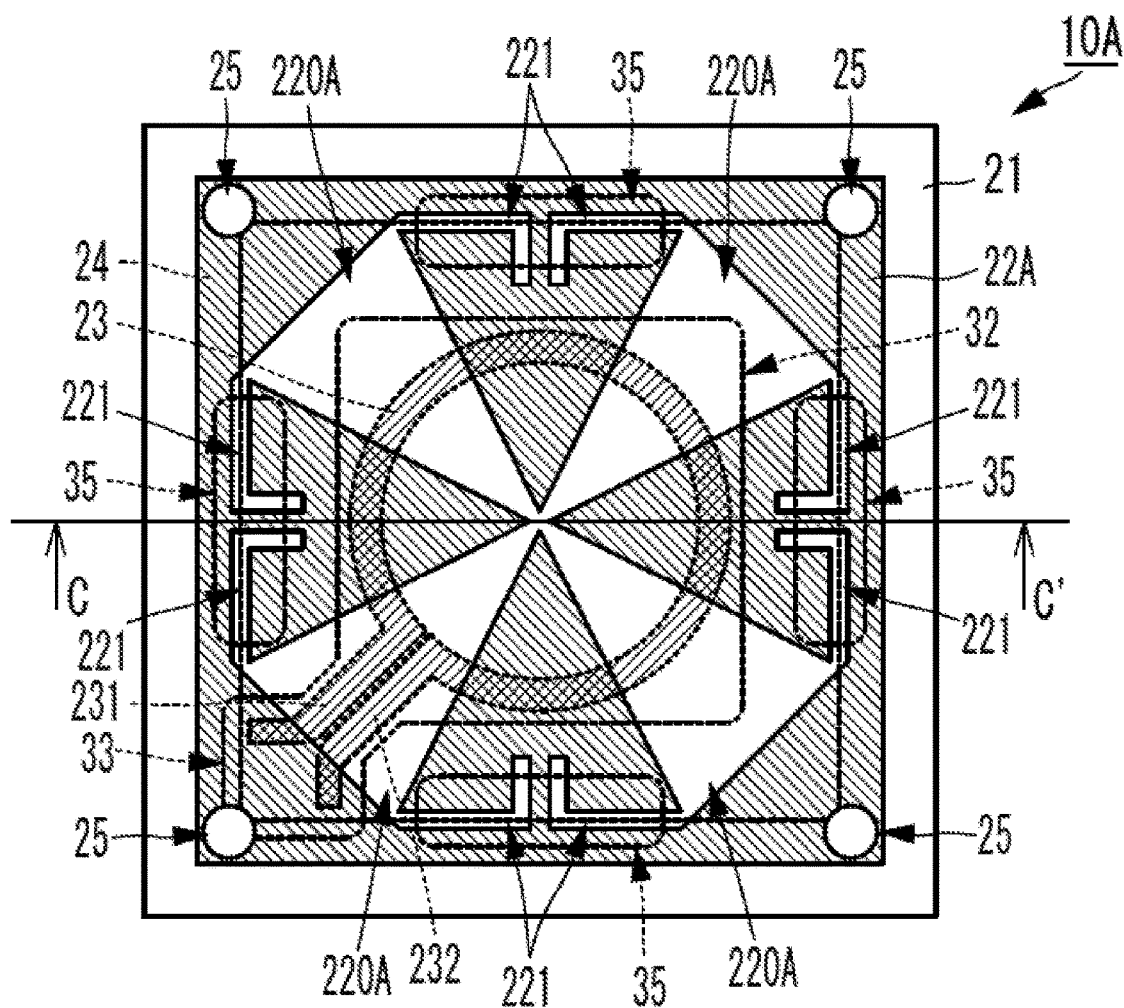
FIG. 9(A) is a plan view of the circularly polarized antenna according to the second embodiment of the present disclosure.
Figure 9B:
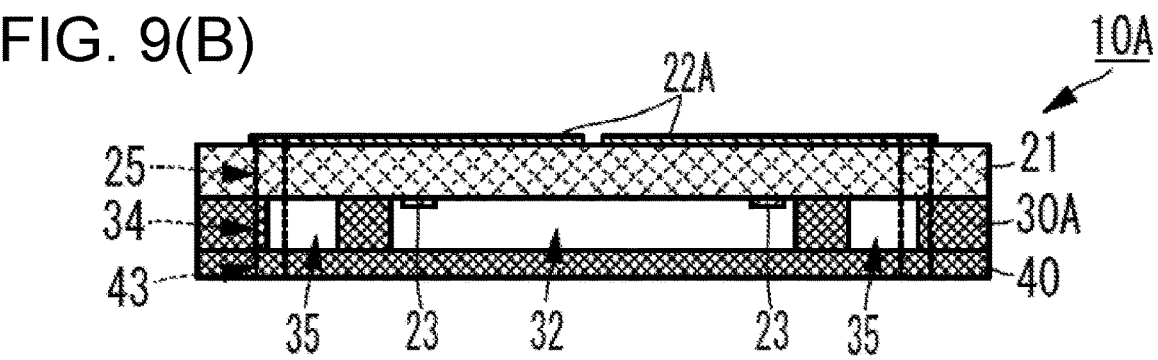
FIG. 9(B) is a cross-sectional side view of the circularly polarized antenna according to the second embodiment of the present disclosure.

Next, a circularly polarized antenna according to a second embodiment of the present disclosure is described with reference to the accompanying drawings. FIG. 7 is an external perspective view of the circularly polarized antenna according to the second embodiment of the present disclosure. FIG. 8 is an exploded perspective view of the circularly polarized antenna according to the second embodiment of the present disclosure. FIG. 9(A) is a plan view of the circularly polarized antenna according to the second embodiment of the present disclosure. In FIG. 9(A), some of conductors are partially hatched in order for easier understanding of the positional relationship of the conductors. FIG. 9(B) is a cross-sectional side view of the circularly polarized antenna according to the second embodiment of the present disclosure. FIG. 9(B) is the cross-sectional view taken along a line C-C' in FIG. 9(A).

The circularly polarized antenna 10A of this embodiment may be different from the circularly polarized antenna 10 of the first embodiment in the shape of an antenna substrate 20A and further in that a second cavity 35 is added to the conductive plate 30.

Figure 10A:
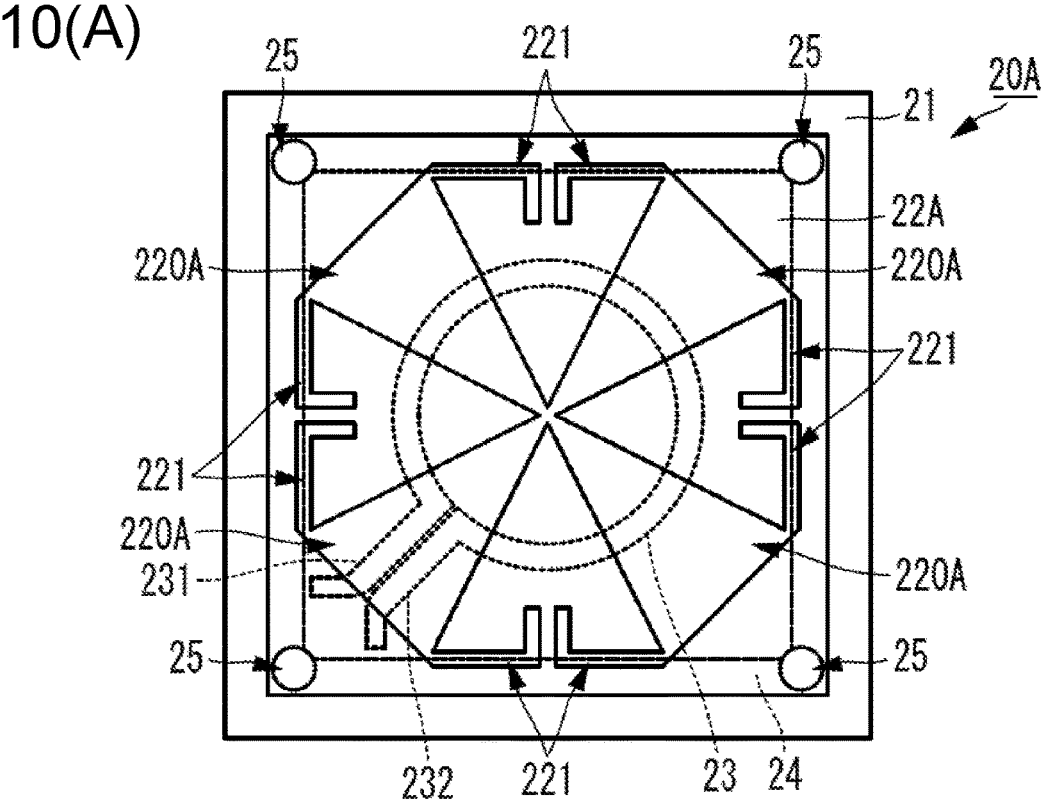
FIG. 10(A) is a plan view of an antenna substrate seen from a front surface thereof according to the second embodiment of the present disclosure.
Figure 10B:
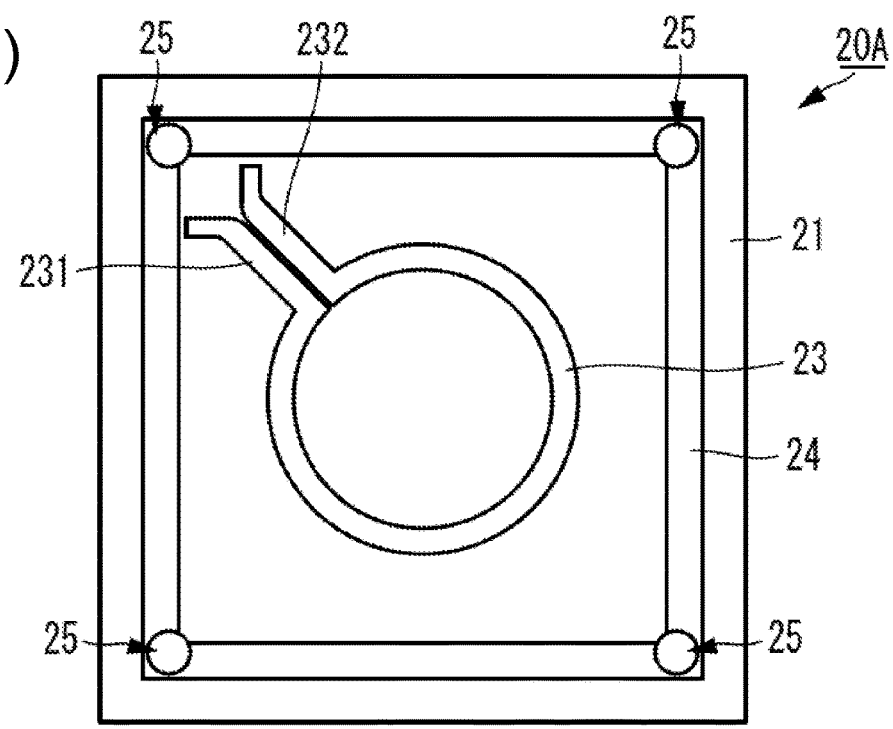
FIG. 10(B) is a plan view of the antenna substrate seen from a rear surface thereof according to the second embodiment of the present disclosure.

FIG. 10(A) is a plan view of the antenna substrate 20A seen from a front surface thereof according to the second embodiment of the present disclosure. FIG. 10(B) is a plan view of the antenna substrate 20A seen from a rear surface thereof according to the second embodiment of the present disclosure.

The antenna substrate 20A may include a dielectric substrate 21, a slot conductor 22A, a loop conductor 23, and a relay conductor 24. The dielectric substrate 21, the loop conductor 23, and the relay conductor 24 may be the same as those in the antenna substrate 20 of the first embodiment. In this embodiment, the slot conductor 22A and the loop conductor 23 may correspond to "flat film conductor" of the present disclosure.

The slot conductor 22A may be formed with bow-tie slots 220A and extension slots 221. The bow-tie slots 220A may have a structure similar to that of the bow-tie slots 220 of the first embodiment except that the length is different. Each extension slot 221 may communicate with an end section of each bow-tie slot 220A on a corner side of the dielectric substrate 21. The extension slot 221 may be achieved by providing a linear-shaped no-conductor-formation portion in the conductor, between the adjacent bow-tie slots 220A. The extension slot 221 may be a slot having a first straight section and a second straight section continuous to each other. The first and second straight sections may be continuous in the order of the first straight section and the second straight section from the side connected to the bow-tie slot 220A. The first straight section may be formed along one side of an outer circumference of the dielectric substrate 21 in vicinity thereto. The first straight section may extend to a substantially middle position between the adjacent bow-tie slots 220A. The second straight section may be formed in a shape extending from the vicinity of the side of the outer circumference toward the center position of the dielectric substrate 21.

Figure 11A:
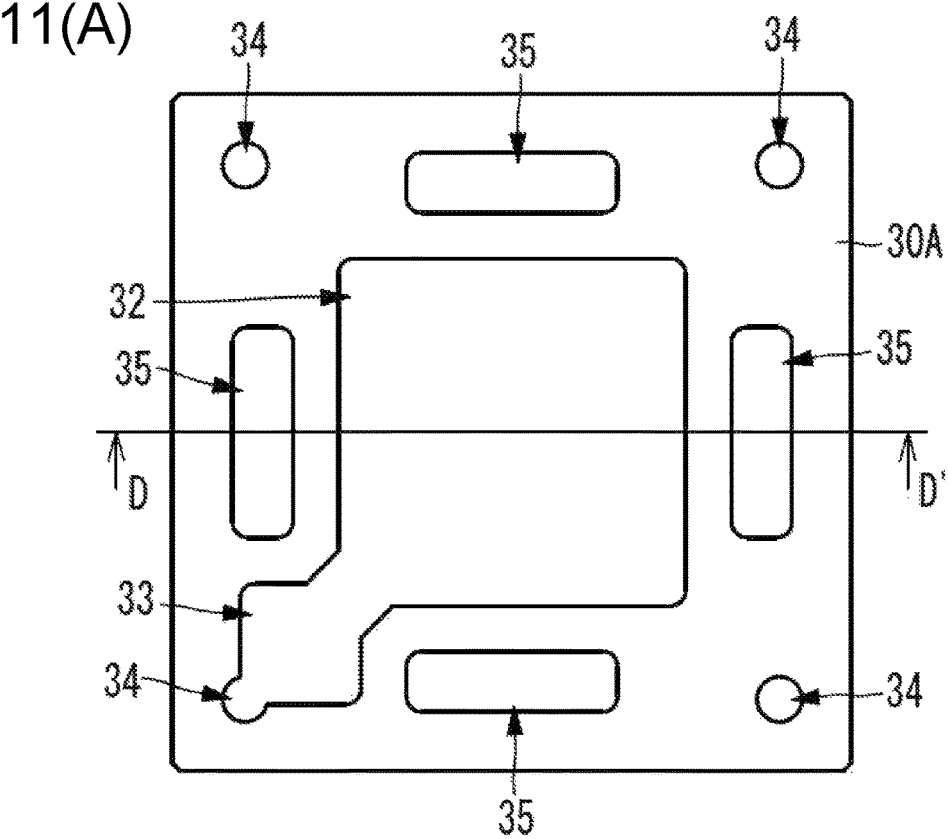
FIG. 11(A) is a plan view of a first conductive plate according to the second embodiment of the present disclosure.
Figure 11B:
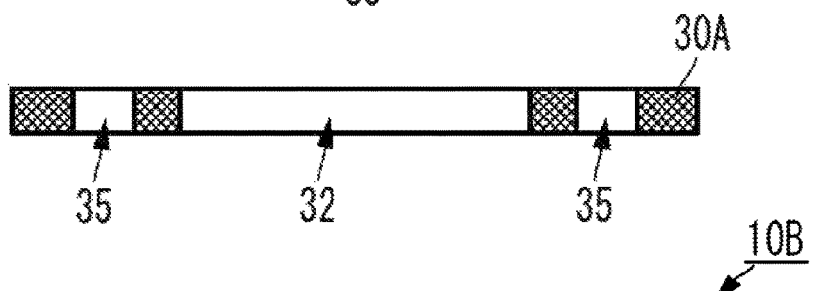
FIG. 11(B) is a cross-sectional side view of the first conductive plate according to the second embodiment of the present disclosure.

FIG. 11(A) is a plan view of a first conductive plate (conductive plate 30A) according to the second embodiment of the present disclosure. FIG. 11(B) is a cross-sectional side view of the first conductive plate (conductive plate 30A) according to the second embodiment of the present disclosure. FIG. 11(B) is the cross-sectional view taken along a line D-D' in FIG. 11(A).

The conductive plate 30A may be formed with the same first cavity 32, wiring hole 33, and through-holes 34 as those of the structure described in the first embodiment. Further, the conductive plate 30A may be formed with a plurality of (four in this embodiment) second cavities 35.

The second cavities 35 may be holes penetrating the conductive plate 30A from the front surface to the rear surface. The plurality of second cavities 35 may respectively be formed between the first cavity 32 and each side of the outer circumference of the conductive plate 30A. That is, each second cavity 35 may be formed near the side of the outer circumference of the conductive plate 30A. The length of the second cavity 35 may be longer in the direction along the side of the outer circumference in vicinity thereto, and shorter in the direction perpendicular to the side of the outer circumference.

The second cavity 35 may be blocked at an opening opposite from the antenna substrate 20A side by the conductive plate 40. Note that, also in the second cavity 35, similar to the first cavity 32 described in the first embodiment, the end surface of the second cavity 35 opposite from the antenna substrate 20A may not be sealed by the conductive plate, as long as this end surface is a discontinuous surface with respect to the transmission-reception signal. Here, the length in the depth direction of the second cavity 35 (electrical length) may be shorter than the half wavelength λ/2 of the transmission-reception signal, for example, one-fourth of the wavelength λ/4.

The antenna substrate 20A and the conductive plate 30A, which are components of the circularly polarized antenna 10A, have the above structures, and as illustrated in FIGS. 7, 8, 9(A) and 9(B), by stacking these components, the following structural characteristics may be provided in addition to those of the circularly polarized antenna 10 of the first embodiment.

By forming the extension slot 221 to communicate with the bow-tie slot 220A as described above, the electrical length of the slot with respect to the transmission-reception signal may be extended to the length obtained by adding the length of the bow-tie slot 220A and the length of the extension slot 221.

Here, the first straight section of the extension slot 221 may extend in a direction different from the extending direction of the bow-tie slot 220A, and the second straight section may extend from one end section on the first straight section side toward the center of the antenna substrate 20A.

Thus, an increase in the planar area of the antenna substrate 20A may be prevented while the length of the bow-tie slot 220A with respect to the transmission-reception signal is shortened. Therefore, the circularly polarized antenna 10A may be downsized.

Further, as illustrated in FIGS. 9(A) and 9(B), the second cavity 35 may be located to overlap with the slot conductor 22A at a position closer to the side of the outer circumference of the circularly polarized antenna 10A than the connected portion between the first and second straight sections of the extension slot 221. Further, when seen in the depth direction of the first and second cavities 32 and 35, each second cavity 35 may be disposed to overlap with the portion where the slot conductor 22A and the relay conductor 24 overlap along the side where the extension slot 221 is formed. In this case, it may be preferable that the slot conductor 22A and the relay conductor 24 are connected with each other at the overlapping portion, by a via conductor.

With such a structure, the wavelength shortening effect by the second cavity 35 may be obtained, and the lengths (electrical length) of the bow-tie slot 220A and the extension slot 221 with respect to the transmission-reception signal may be shortened.

Therefore, by forming the extension slot 221 and the second cavity 35, it is possible to further reduce the planar area of the antenna substrate 20A which is in relation to the wavelength λ of the transmission-reception signal, and the circularly polarized antenna 10A may further be downsized.

As described above, by using the structure of this embodiment, the circularly polarized antenna 10A may be downsized even more. Note that, even in a case where the extension slot 221 of this embodiment is not formed but the second cavity is formed, the planar area of the antenna substrate may be reduced and the circularly polarized antenna may be downsized. In this case, it may suffice that the second cavity is formed so as to overlap with the slot conductor 22A near the end section of the bow-tie slot 220A on the corner side of the dielectric substrate 21.

Figure 12:
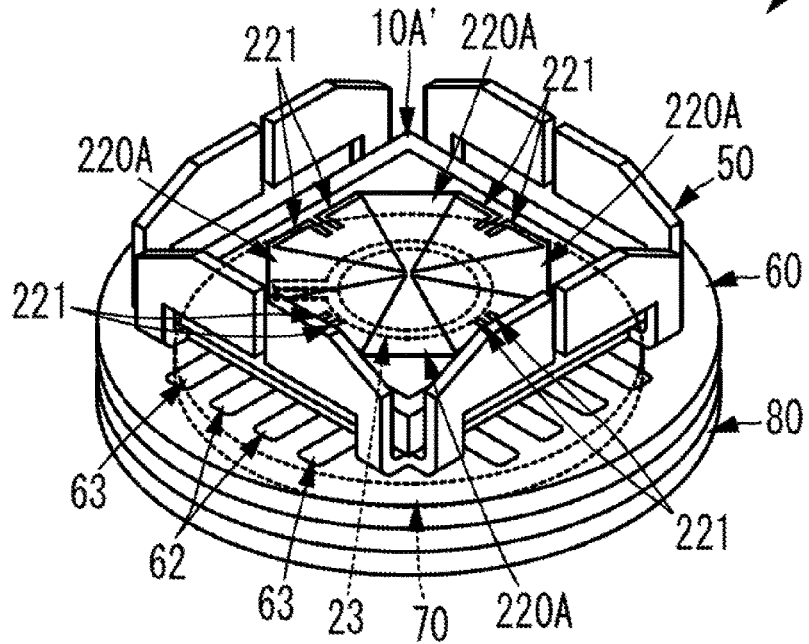
FIG. 12 is an external perspective view of a circularly polarized antenna according to a third embodiment of the present disclosure.
Figure 13:
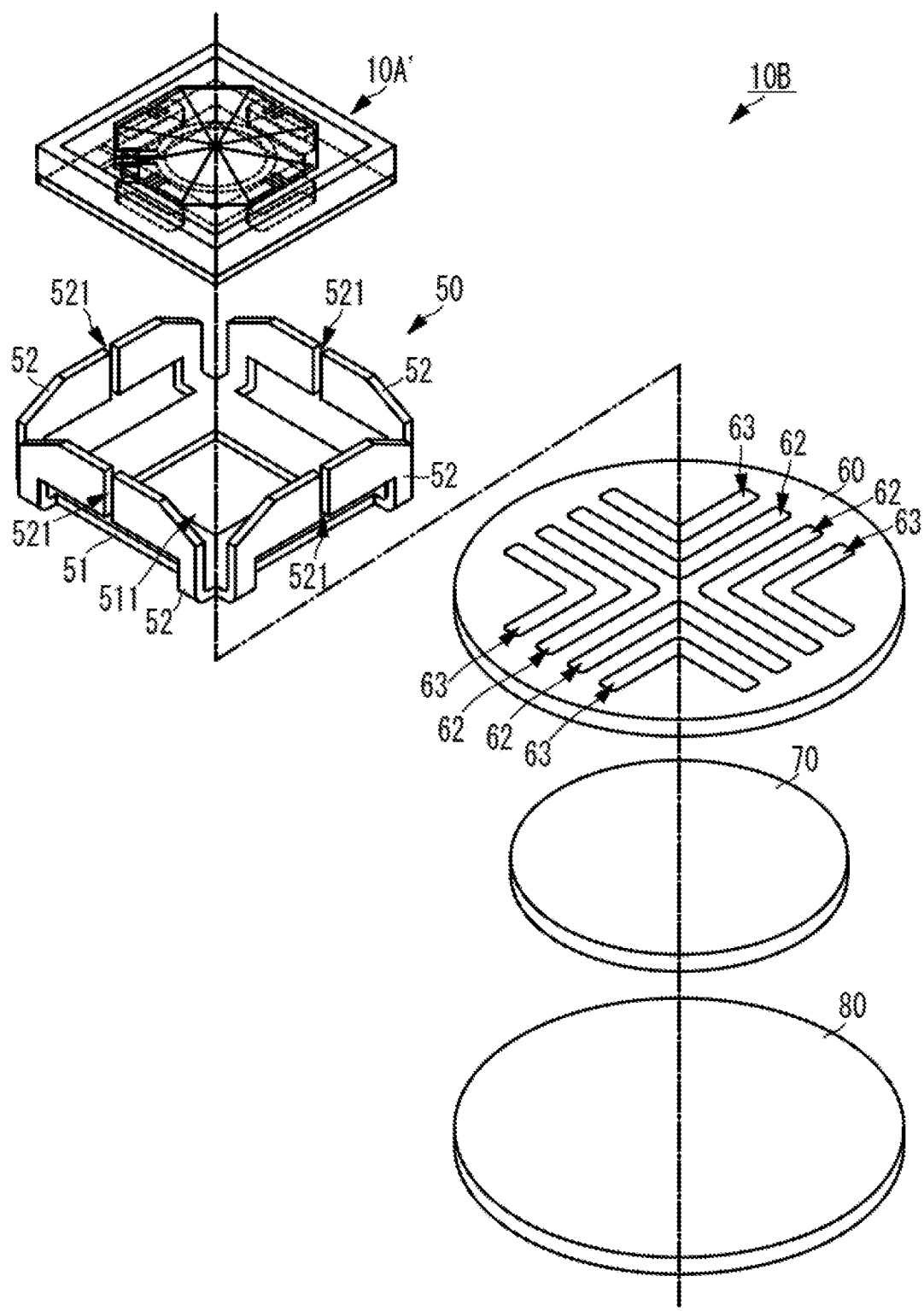
FIG. 13 is an exploded perspective view of the circularly polarized antenna according to the third embodiment of the present disclosure.
Figure 14A:
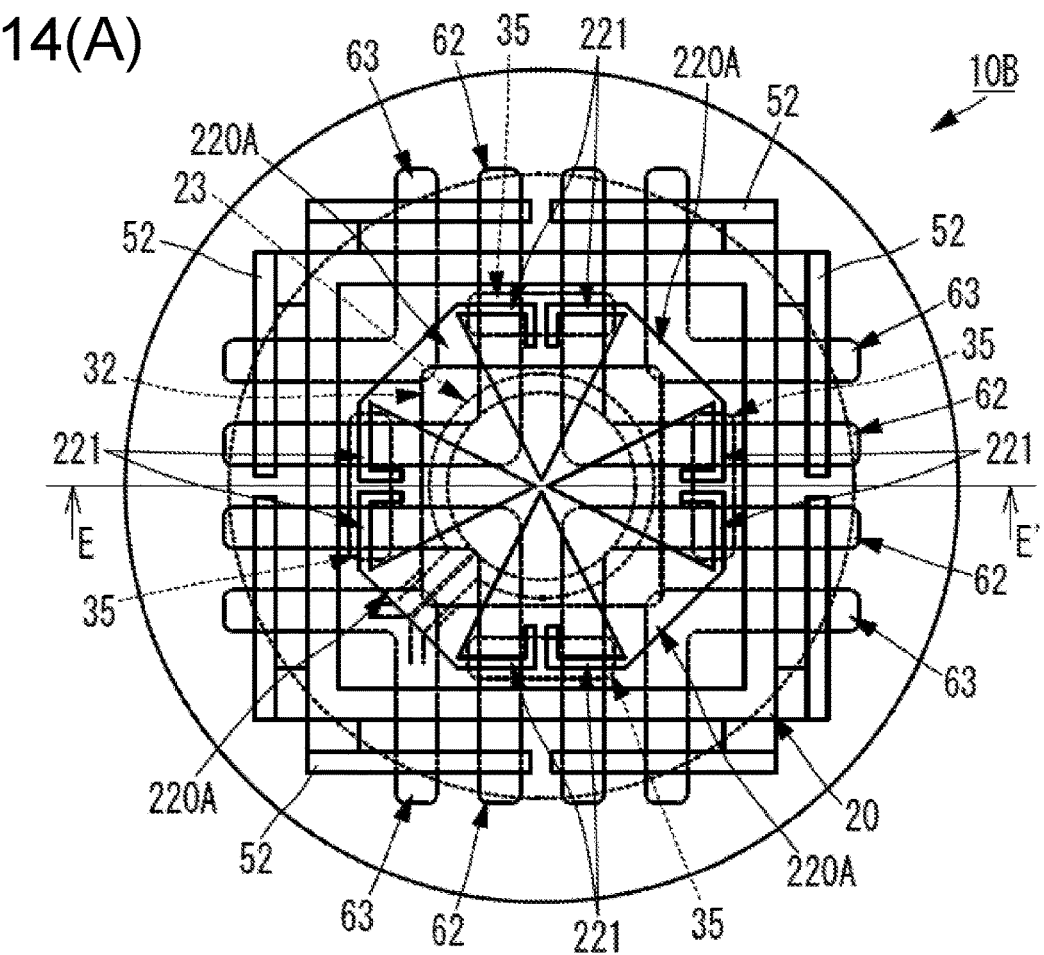
FIG. 14(A) is a plan view of the circularly polarized antenna according to the third embodiment of the present disclosure.
Figure 14B:
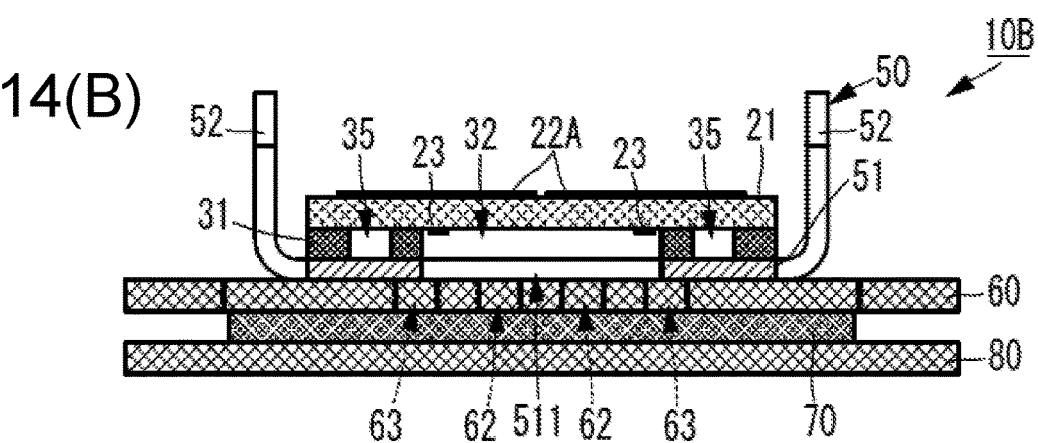
FIG. 14(B) is a cross-sectional side view of the circularly polarized antenna according to the third embodiment of the present disclosure.

Next, a circularly polarized antenna according to a third embodiment of the present disclosure is described with reference to the accompanying drawings. FIG. 12 is an external perspective view of the circularly polarized antenna according to the third embodiment of the present disclosure. FIG. 13 is an exploded perspective view of the circularly polarized antenna according to the third embodiment of the present disclosure. FIG. 14(A) is a plan view of the circularly polarized antenna according to the third embodiment of the present disclosure. In FIG. 14(A), some of conductors are partially hatched in order for easier understanding of the positional relationship of the conductors. FIG. 14(B) is a cross-sectional side view of the circularly polarized antenna according to the third embodiment of the present disclosure. FIG. 14(B) is the cross-sectional view taken along a line E-E' in FIG. 14(A).

The circularly polarized antenna 10B of this embodiment may include a circularly polarized antenna 10A' of the second embodiment, an auxiliary radiation member 50, a conductive plate 60, a dielectric substrate 70, and a conductive plate 80. The circularly polarized antenna 10A' may include the structure of the circularly polarized antenna 10A of the second embodiment with omission of the conductive plate 40.

As illustrated in FIGS. 12, 13, 14(A) and 14(B), the circularly polarized antenna 10A', the auxiliary radiation member 50, the conductive plate 60, the dielectric substrate 70, and the conductive plate 80 may be stacked in this order. For example, a front surface of a base member 51 of the auxiliary radiation member 50 may be in contact with a rear surface of the circularly polarized antenna 10A', the dielectric substrate 70 may be in contact with the rear surface of the base member 51 of the auxiliary radiation member 50, and the conductive plate 80 may be in contact with the rear surface of the dielectric substrate 70.

Figure 15:
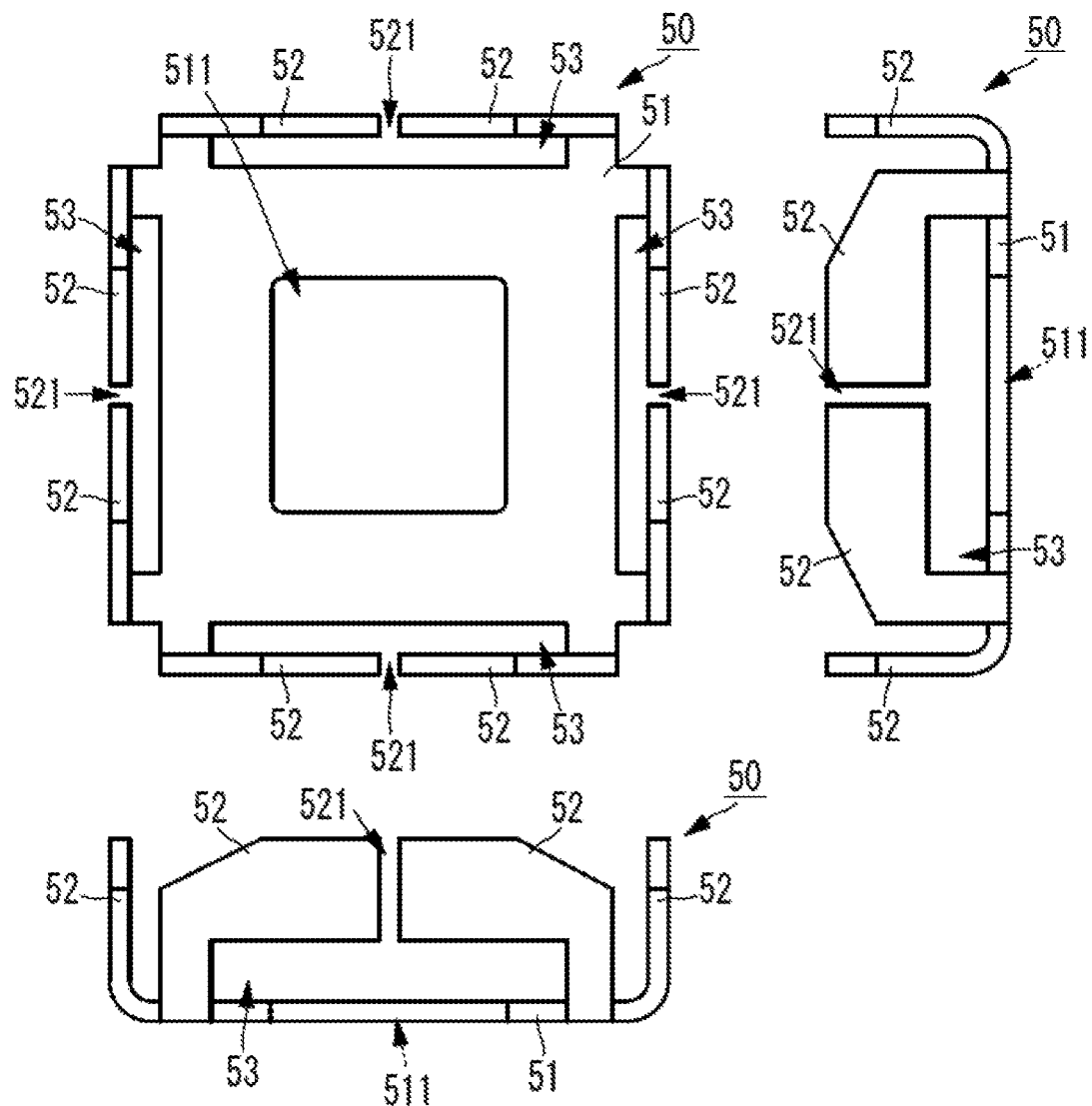
FIG. 15 shows three views of an auxiliary radiation member according to the third embodiment of the present disclosure.

FIG. 15 shows three views (a plan view, a first side view, and a second side view) of the auxiliary radiation member according to the third embodiment of the present disclosure.

The auxiliary radiation member 50 may include the base member 51 and a plurality of standing members 52. The base member 51 and the standing members 52 may integrally be formed by bending a single conductive plate.

The base member 51 may have a rectangular shape (square in this embodiment) in a plan view. The base member 51 may be formed with a through-hole 511. The through-hole 511 may be a hole penetrating the base member 51 from the front surface to the rear surface. The through-hole 511 may have substantially the same shape as that of the first cavity 32 formed in the conductive plate 30 in a plan view.

The plurality of standing members 52 may be formed to be connected with the sides of the rectangular base member 51, respectively. The flat plate surface of each standing member 52 may extend perpendicularly to the flat plate surface of the base member 51.

A connected portion between the standing member 52 and the base member 51 may be formed with an opening 53. With the opening 53, each standing member 52 may be connected to the base member 51 for a given length near each corner of the base member 51.

A slit 521 may be formed at an end portion of the standing member 52 opposite from the side connected to the base member 51. The slit 521 may communicate with the opening 53.

Figure 16:
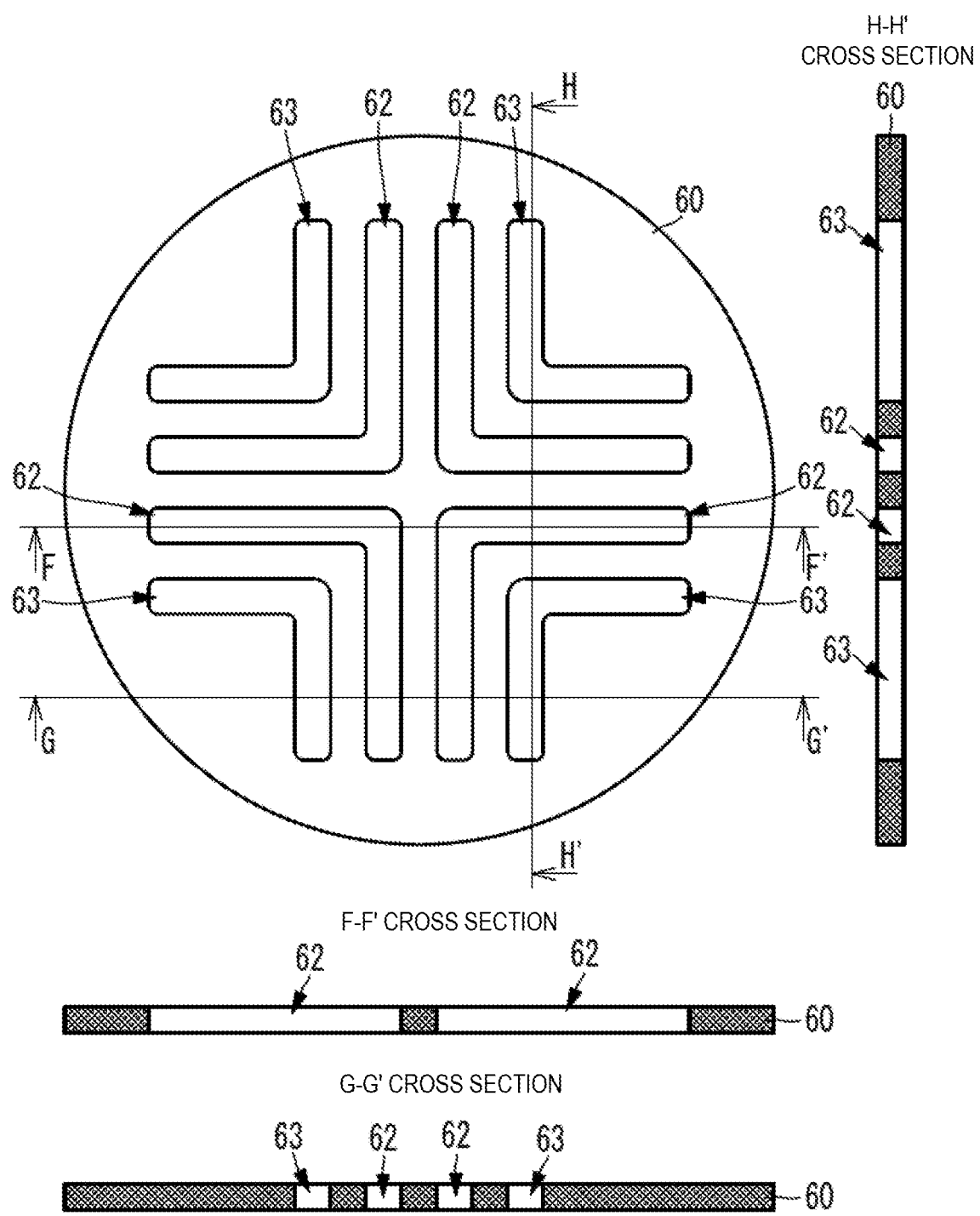
FIG. 16 shows a plan view and first, second and third cross-sectional side views of a conductive plate according to the third embodiment of the present disclosure.

FIG. 16 shows a plan view and first, second and third cross-sectional side views of a conductive plate according to the third embodiment of the present disclosure. The first cross-sectional view indicates a cross section taken along a line F-F' in the plan view of FIG. 16, the second cross-sectional view indicates a cross section taken along a line G-G' in the plan view of FIG. 16, and the third cross-sectional view indicates a cross section taken along a line H-H' in the plan view of FIG. 16.

The conductive plate 60 may be a circular plate. Similar to the conductive plates 30 and 40, the conductive plate 60 may be made of a highly conductive material. For example, the material of the conductive plate 60 may be SUS etc.

The conductive plate 60 may be formed with a plurality of slots 62 and a plurality of slots 63. The lengths of the slots 62 and 63 in their extending directions may be set based on the wavelength λ of the transmission-reception signal. The slots 62 and 63 may penetrate the conductive plate 60 from the front surface to the rear surface. Each of the slots 62 and 63 may be bent about 90° at an intermediate position in the extending direction. The slots 62 and 63 may be formed such that the bent section is at the center side of the conductive plate 60 and both ends are at the outer circumferential side of the conductive plate 60. The plurality of (four in this embodiment) slots 62 may be formed with a given angle difference (90° in this embodiment) from each other with respect to the center of the conductive plate 60 in a plan view. Similarly, the plurality of (four in this embodiment) slots 63 may be formed with a given angle difference (90° in this embodiment) from each other with respect to the center of the conductive plate 60 in a plan view. The slots 62 and the slots 63 may be formed so that the bent section of each slot 62 is located closer to the center of the conductive plate 60 than the bent section of the slot 63. These slots 62 and 63 may correspond to "rear side slots" of the present disclosure.

As illustrated in FIGS. 12, 14(A) and 14(B), the auxiliary radiation member 50 and the conductive plate 60 having such a structure may be stacked on each other, together with the circularly polarized antenna 10A', the dielectric substrate 70, and the conductive plate 80.

For example, the center of the circularly polarized antenna 10A' in a plan view, the center of the auxiliary radiation member 50 in a plan view, the center of the conductive plate 60 in a plan view, the center of the disk-shaped dielectric substrate 70 in a plan view, and the center of the disk-shaped conductive plate 80 in a plan view may be in agreement with each other in a plan view of the circularly polarized antenna 10B.

In a plan view of the circularly polarized antenna 10B, the through-hole 511 of the auxiliary radiation member 50 may communicate with the first cavity 32 of the circularly polarized antenna 10A' by overlapping therewith. The auxiliary radiation member 50 may be disposed in such an orientation that the standing members 52 surround the circularly polarized antenna 10A'. The conductive plate 60 may be disposed such that the bent sections of the slots 62 overlap with the bow-tie slots 220A.

With such a structure, an electromagnetic wave leaked from the circularly polarized antenna 10A' to the rear surface side, which is opposite from the radiation surface of the circularly polarized antenna 10A' (rear surface leaky wave), may be excited by the slots 62 or the slots 63. The excited rear surface leaky wave may be fed to a portion where the dielectric substrate 70 is sandwiched between the conductive plate 60 and the conductive plate 80 (rear surface leakage reducing portion). Here, the shapes of the conductive plates 60 and 80, the shape of the dielectric substrate 70, and the permittivity of the dielectric substrate 70 may be set suitably. Thus, a leaky wave coming from the radiation surface side of the circularly polarized antenna 10A' around the side surface, may be canceled by the rear surface leaky wave which is fed from one of the slots 62 and 63 to the rear surface leakage reducing portion. Thus, the circularly polarized antenna 10B may transmit and receive waves to and from the radiation surface side more efficiently. That is, a circularly polarized antenna with more excellent radiation characteristics may be achieved.

Further, by bending the slots 62 and 63, the number of formable slots in a prescribed area may be increased. Thus, while improving the radiation characteristics, a size increase of the conductive plate 60 may be prevented and the circularly polarized antenna 10B may be downsized.

Further, although the dielectric substrate 70 is disposed between the conductive plates 60 and 80 in the circularly polarized antenna 10B of this embodiment, this may be omitted. Note that, by disposing the dielectric substrate 70, the distance between the conductive plates 60 and 80 may be shortened while achieving the rear surface leakage reducing effect. Thus, the circularly polarized antenna 10B which is lower in height, that is, a more compact circularly polarized antenna 10B may be achieved.

Figure 17:
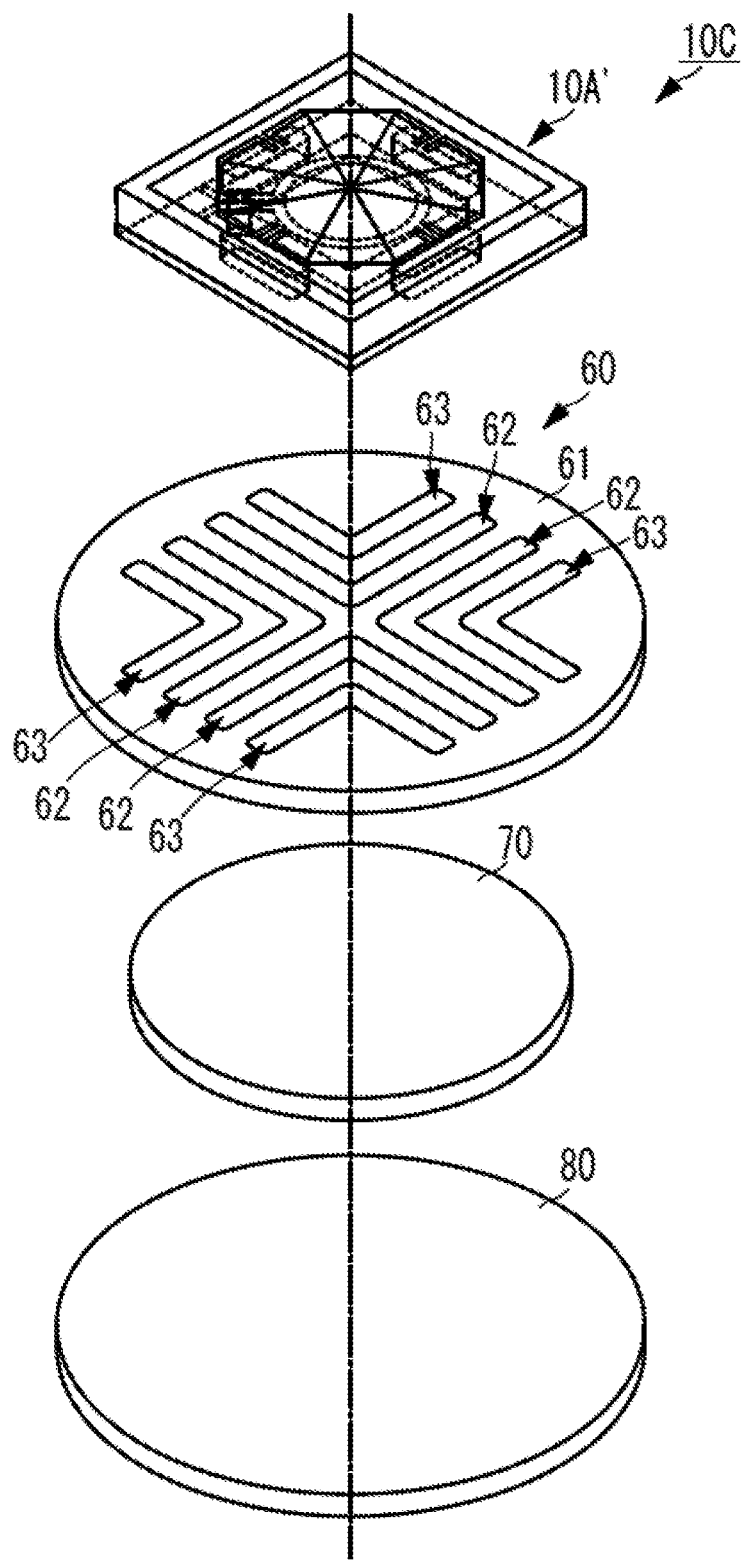
FIG. 17 is an exploded perspective view of a circularly polarized antenna according to a fourth embodiment of the present disclosure.

Next, a circularly polarized antenna according to a fourth embodiment of the present disclosure is described with reference to the accompanying drawing. FIG. 17 is an exploded perspective view of the circularly polarized antenna according to the fourth embodiment of the present disclosure.

The circularly polarized antenna 10C of this embodiment may be different from the circularly polarized antenna 10B of the third embodiment in that the auxiliary radiation member 50 is omitted.

Even with such a structure, the compact circularly polarized antenna 10C having excellent radiation characteristics may be achieved similarly to each of the embodiments described above. However, as described with the circularly polarized antenna 10B above, by providing the auxiliary radiation member 50, the radiation characteristics may be improved even more.

Figure 18:
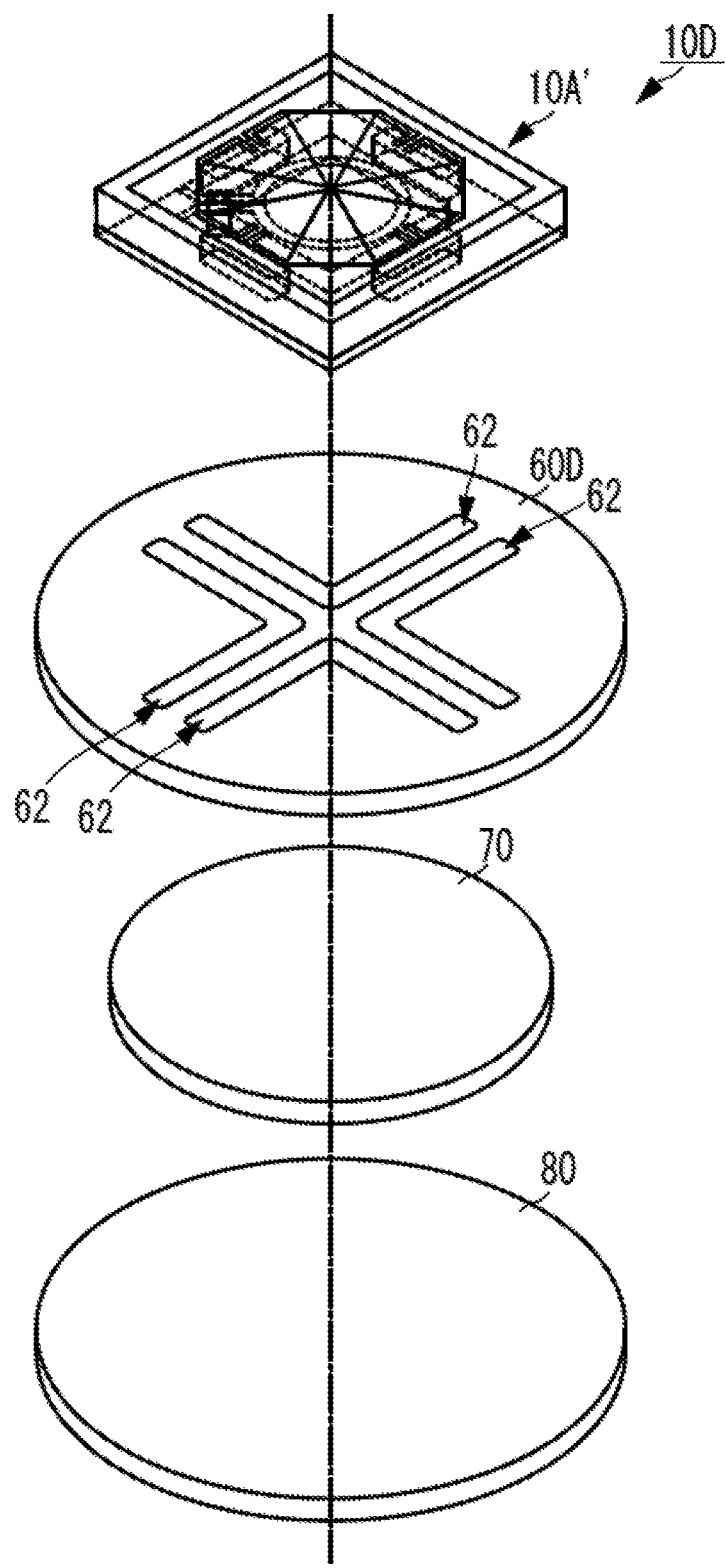
FIG. 18 is an exploded perspective view of a circularly polarized antenna according to a fifth embodiment of the present disclosure.

Next, a circularly polarized antenna according to a fifth embodiment of the present disclosure is described with reference to the accompanying drawing. FIG. 18 is an exploded perspective view of the circularly polarized antenna according to the fifth embodiment of the present disclosure.

The circularly polarized antenna 10D of this embodiment may be different from the circularly polarized antenna 10C of the fourth embodiment in the structure of a conductive plate 60D. The conductive plate 60D may include a plurality of slots 62. That is, the circularly polarized antenna 10D of this embodiment may be different from the circularly polarized antenna 10C of the fourth embodiment in that the plurality of slots 63 are omitted.

Even with such a structure, the compact circularly polarized antenna 10D having excellent radiation characteristics may be achieved similarly to each of the embodiments described above. However, as described with the circularly polarized antennas 10B and 10C above, by providing the slots 62 and 63 having different lengths, the radiation characteristics may be improved even more for a plurality of frequencies. For example, the circularly polarized antennas 10B and 10C may receive, with high gain, two kinds of positioning signals of GPS, GLONASS and Galileo in GNSS. Note that, since the frequencies of these positioning signals are close to each other, settings may be conducted so that a desired gain is obtainable with only the slots 62. However, if the frequencies of the two kinds of transmission-reception signals are far from each other, it may be preferable that slots having length corresponding to the respective frequencies are formed.

Note that, the structures of the above respective embodiments may suitably be combined, and by this combination, a compact circularly polarized antenna with high gain with respect to a desired transmission-reception signal may be achieved.

Figure 19:
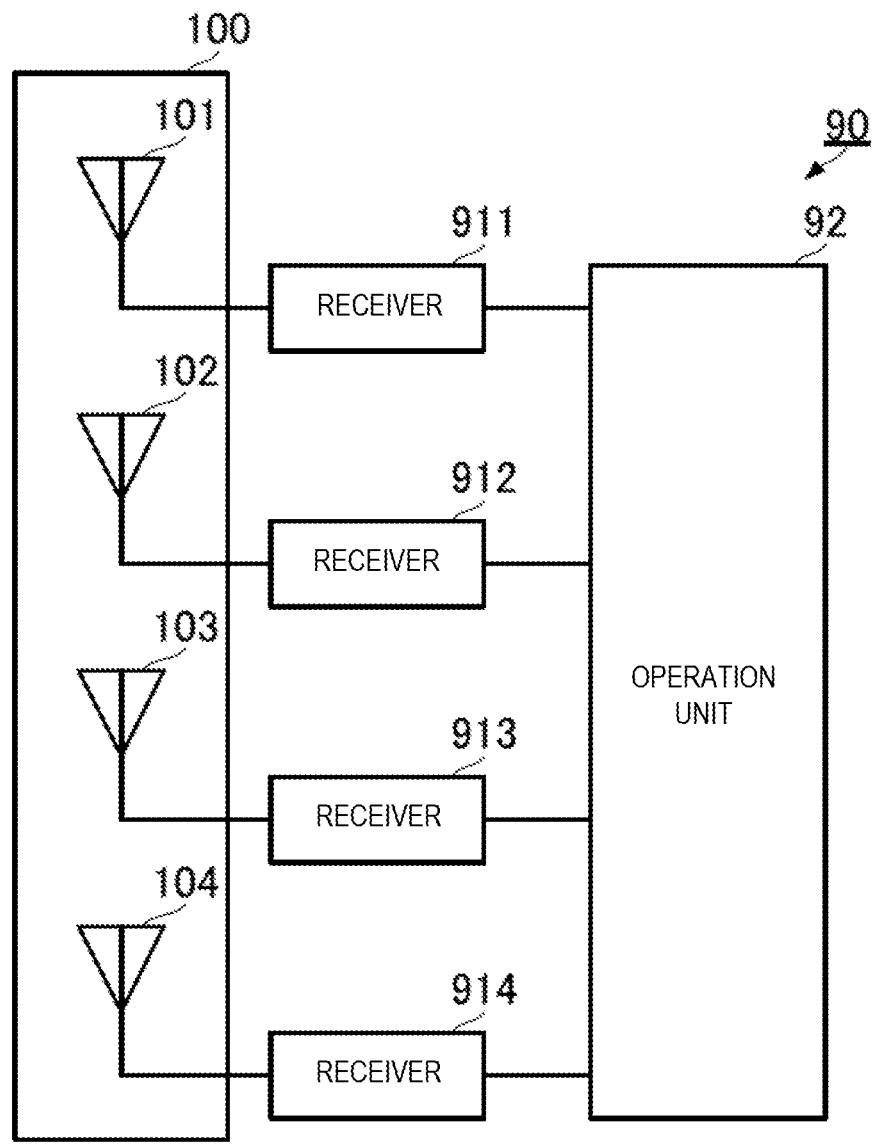
FIG. 19 is a block diagram of an attitude calculating device according to one embodiment of the present disclosure.

The above circularly polarized antennas may be applied to, for example, the following attitude calculating device. FIG. 19 is a block diagram of an attitude calculating device according to one embodiment of the present disclosure.

The attitude calculating device 90 may include an antenna device 100, a receiver 911~914, and an operation unit 92. The antenna device 100 may include antenna elements 101, 102, 103 and 104. The antenna elements 101, 102, 103 and 104 may have the configuration of the circularly polarized antenna described in any one of the above embodiments. The antenna elements 101, 102, 103 and 104 may be arranged on a single plane so that at least one antenna element is not aligned with the other antennas.

The receiver 911 may be connected to the antenna element 101. The receiver 911 may acquire and track the positioning signals received by the antenna element 101, and detect a carrier phase. The receiver 912 may be connected to the antenna element 102. The receiver 912 may acquire and track the positioning signals received by the antenna element 102, and detect a carrier phase. The receiver 913 may be connected to the antenna element 103. The receiver 913 may acquire and track the positioning signals received by the antenna element 103, and detect a carrier phase. The receiver 914 may be connected to the antenna element 104. The receiver 914 may acquire and track the positioning signals received by the antenna element 104, and detect a carrier phase. The receivers 911, 912, 913 and 914 may output the detected carrier phases to the operation unit 92.

The operation unit 92 may calculate a difference in carrier phase between the same positioning signals detected by the two receivers. The operation unit 92 may sequentially calculate the difference in carrier phase (carrier phase difference), and calculate an attitude based on these carrier phase differences by a known method.

With the attitude calculating device 90, by using the circularly polarized antennas described above, the attitude calculating device 90 may be downsized.

Note that, although the example of calculating the attitude as navigation information is described in the above description, other navigation information, such as the position, the speed, etc., may be calculated.

The invention claimed is:

1. A circularly polarized antenna, comprising:
an antenna substrate formed with a flat film conductor, the flat film conductor being configured:
to include a loop conductor, and
to transmit and receive a circularly polarized wave; and
a cavity configured:
to be formed at an opposite side from a radiation surface of the antenna substrate,
to at least partially overlap with the flat film conductor in a depth direction of the cavity,
to have a size at least in one direction shorter than half of a wavelength of the circularly polarized wave, and
to include a first cavity, the first cavity being configured to fully overlap with the loop conductor in the depth direction of the cavity.

2. The circularly polarized antenna of claim 1, wherein the size of the first cavity in the one direction is the size of the first cavity in a direction orthogonal to the depth direction of the first cavity.

3. The circularly polarized antenna of claim 2, wherein, the flat film conductor includes a slot conductor formed with a slot, and
the cavity includes a second cavity, the second cavity being configured to at least partially overlap with the slot conductor in the depth direction of the cavity.

4. The circularly polarized antenna of claim 3, wherein the second cavity is configured to overlap with the slot conductor near one side of an outer circumference of the slot conductor.

5. The circularly polarized antenna of claim 2, wherein, the flat film conductor includes a slot conductor formed with a slot, and
the cavity includes a second cavity, the second cavity being configured:
to be located between the first cavity and one side of an outer circumference of the antenna substrate, and
to at least partially overlap with the slot conductor in the depth direction of the cavity.

6. The circularly polarized antenna of claim 1, wherein, the flat film conductor includes a slot conductor formed with a slot, and
the cavity includes a second cavity, the second cavity being configured to at least partially overlap with the slot conductor in the depth direction of the cavity.

7. The circularly polarized antenna of claim 6, wherein the second cavity is configured to overlap with the slot conductor near one side of an outer circumference of the slot conductor.

8. The circularly polarized antenna of claim 6, wherein the size of the second cavity in the one direction is the size of the second cavity in the depth direction of the second cavity.

9. The circularly polarized antenna of claim 6, wherein the slot is a bow-tie slot.

10. The circularly polarized antenna of claim 8, wherein the slot is a bow-tie slot.

11. The circularly polarized antenna of claim 1, wherein, the flat film conductor includes a slot conductor formed with a slot, and
the cavity includes a second cavity, the second cavity being configured to at least partially overlap with the slot conductor in the depth direction of the cavity.

12. The circularly polarized antenna of claim 11, wherein the second cavity is configured to overlap with the slot conductor near one side of an outer circumference of the slot conductor.

13. The circularly polarized antenna of claim 1, wherein, the flat film conductor includes a slot conductor formed with a slot, and
the cavity includes a second cavity, the second cavity being configured:
to be located between the first cavity and one side of an outer circumference of the antenna substrate, and
to at least partially overlap with the slot conductor in the depth direction of the cavity.

14. The circularly polarized antenna of claim 13, wherein the size of the second cavity in the one direction is the size of the second cavity in the depth direction of the second cavity.

15. The circularly polarized antenna of claim 13, wherein the slot is a bow-tie slot.

16. The circularly polarized antenna of claim 1, further comprises, on one side of the cavity opposite from the antenna substrate:
a rear-side slot formed to have a length set based on the wavelength of the circularly polarized wave; and
a radiation plate configured to radiate a leaky wave excited by the rear-side slot.

17. The circularly polarized antenna of claim 16, further including a dielectric substrate disposed on one side of the radiation plate opposite from the cavity.

18. The circularly polarized antenna of claim 16, wherein the rear-side slot has a shape that bends at an intermediate position in an extending direction thereof.

19. An attitude calculating device, comprising:
the circularly polarized antenna of claim 1;
a receiver configured:
to connect with the circularly polarized antenna, and
to acquire positioning signals received by the circularly polarized antenna; and
processing circuitry configured to calculate an attitude of the attitude calculating device based on the acquired positioning signals.

* * * * *